United States Patent
Hershkowitz et al.

(10) Patent No.: US 9,322,549 B2
(45) Date of Patent: Apr. 26, 2016

(54) MIXER/FLOW DISTRIBUTORS

(71) Applicants: Frank Hershkowitz, Basking Ridge, NJ (US); Jeffrey W. Frederick, Centreville, VA (US); Timothy M. Healy, Centreville, VA (US); Ying Liu, Vienna, VA (US)

(72) Inventors: Frank Hershkowitz, Basking Ridge, NJ (US); Jeffrey W. Frederick, Centreville, VA (US); Timothy M. Healy, Centreville, VA (US); Ying Liu, Vienna, VA (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 488 days.

(21) Appl. No.: 13/705,923

(22) Filed: Dec. 5, 2012

(65) Prior Publication Data

US 2013/0157205 A1   Jun. 20, 2013

Related U.S. Application Data

(60) Provisional application No. 61/578,086, filed on Dec. 20, 2011.

(51) Int. Cl.
| | |
|---|---|
| *F23N 1/02* | (2006.01) |
| *F23C 5/32* | (2006.01) |
| *F27B 19/04* | (2006.01) |
| *B01J 8/04* | (2006.01) |
| *B01F 5/00* | (2006.01) |
| *C01B 3/24* | (2006.01) |
| *C10G 9/38* | (2006.01) |

(Continued)

(52) U.S. Cl.
CPC ............... *F23C 5/32* (2013.01); *B01F 5/0065* (2013.01); *B01J 8/0438* (2013.01); *B01J 8/0492* (2013.01); *B01J 8/0496* (2013.01); *C01B 3/24* (2013.01); *C10G 9/38* (2013.01); *F23N 1/02* (2013.01); *F27B 19/04* (2013.01); *B01F 5/0688* (2013.01); *B01F 2215/0085* (2013.01); *B01F 2215/0431* (2013.01); *B01J 2208/0092* (2013.01); *B01J 2208/00849* (2013.01); *B01J 2208/00902* (2013.01); *B01J 2208/00929* (2013.01); *B01J 2208/00938* (2013.01); *C01B 2203/0266* (2013.01); *C01B 2203/0811* (2013.01)

(58) Field of Classification Search
CPC .............. C10G 9/38; C01B 2203/0811; B01F 2215/0431; B01F 2215/0085; F23D 14/66; B01J 8/085; B01J 8/087; B01J 2219/00763
USPC ............... 431/11, 9, 212, 215, 217, 247, 162, 431/174, 181, 183
See application file for complete search history.

(56) References Cited

U.S. PATENT DOCUMENTS

| 2,319,679 A | 5/1943 | Hasche et al. |
| 2,678,339 A | 5/1954 | Harris |

(Continued)

FOREIGN PATENT DOCUMENTS

WO   2013/095931   6/2013

OTHER PUBLICATIONS

Stanford Research Institute's Process Economics Program Report No. 16, titled "Acetylene", pp. 8-9, 13-23, and 59-79 (1966).

(Continued)

*Primary Examiner* — Gregory Huson
*Assistant Examiner* — Daniel E Namay

(57) ABSTRACT

The invention relates mixer/flow distributors and their use, e.g., in regenerative reactors. The invention encompasses a process and apparatus for controlling oxidation, e.g., for thermally regenerating a reactor, such as a regenerative, reverse-flow reactor.

17 Claims, 7 Drawing Sheets

(51) Int. Cl.
*C01B 3/32* (2006.01)
*B01F 5/06* (2006.01)

(56) References Cited

U.S. PATENT DOCUMENTS

| | | | |
|---|---|---|---|
| 2,692,819 A | 10/1954 | Hasche et al. | |
| 3,093,697 A | 6/1963 | Kasbohm et al. | |
| 4,240,805 A | 12/1980 | Sederquist | |
| 5,513,981 A * | 5/1996 | Harbeck et al. | 431/263 |
| 6,289,851 B1 * | 9/2001 | Rabovitser et al. | 122/95.2 |
| 6,520,767 B1 * | 2/2003 | Ahern et al. | 431/4 |
| 7,491,250 B2 | 2/2009 | Hershkowitz et al. | |
| 7,651,331 B2 * | 1/2010 | Veenstra | 431/181 |
| 7,704,070 B2 * | 4/2010 | Veenstra | 431/181 |
| 7,815,873 B2 | 10/2010 | Sankaranarayanan et al. | |
| 7,846,401 B2 * | 12/2010 | Hershkowitz et al. | 422/198 |
| 7,871,587 B2 | 1/2011 | Gu et al. | |
| 7,914,667 B2 * | 3/2011 | Keusenkothen et al. | 208/128 |
| 7,943,808 B2 * | 5/2011 | Hershkowitz et al. | 585/539 |
| 8,106,248 B2 * | 1/2012 | Keusenkothen et al. | 585/400 |
| 8,119,076 B2 * | 2/2012 | Keusenkothen et al. | 422/187 |
| 8,303,803 B2 * | 11/2012 | Keusenkothen et al. | 208/128 |
| 8,450,552 B2 * | 5/2013 | Hershkowitz et al. | 585/899 |
| 8,454,911 B2 * | 6/2013 | Hershkowitz et al. | 422/628 |
| 8,455,707 B2 * | 6/2013 | Hershkowitz et al. | 585/535 |
| 8,821,806 B2 * | 9/2014 | Hershkowitz et al. | 422/240 |
| 2003/0096204 A1 | 5/2003 | Hermann et al. | |
| 2005/0123808 A1 * | 6/2005 | Draper et al. | 429/13 |
| 2005/0142507 A1 | 6/2005 | Sugimoto et al. | |
| 2006/0127832 A1 | 6/2006 | Sugimoto et al. | |
| 2007/0144940 A1 * | 6/2007 | Hershkowitz et al. | 208/107 |
| 2007/0191664 A1 * | 8/2007 | Hershkowitz et al. | 585/539 |
| 2008/0300438 A1 * | 12/2008 | Keusenkothen et al. | 585/400 |
| 2009/0008292 A1 * | 1/2009 | Keusenkothen et al. | 208/81 |
| 2009/0142716 A1 * | 6/2009 | Jubb et al. | 431/9 |
| 2010/0288617 A1 * | 11/2010 | Hershkowitz et al. | 201/18 |
| 2010/0292523 A1 * | 11/2010 | Hershkowitz et al. | 585/648 |
| 2011/0008226 A1 * | 1/2011 | Hershkowitz et al. | 422/630 |
| 2011/0009681 A1 * | 1/2011 | Hershkowitz et al. | 585/303 |
| 2011/0123405 A1 * | 5/2011 | Keusenkothen et al. | 422/187 |
| 2012/0116120 A1 * | 5/2012 | Keusenkothen et al. | 562/607 |
| 2013/0309618 A1 * | 11/2013 | Horn et al. | 431/181 |

OTHER PUBLICATIONS

Beer, "Combustion Aerodynamics", pp. 61-89, 1969.
Melissinos, Experiments in Modern Physics, "Elements from the Theory of Statistics", pp. 438-487, Academic Press 1966.

* cited by examiner

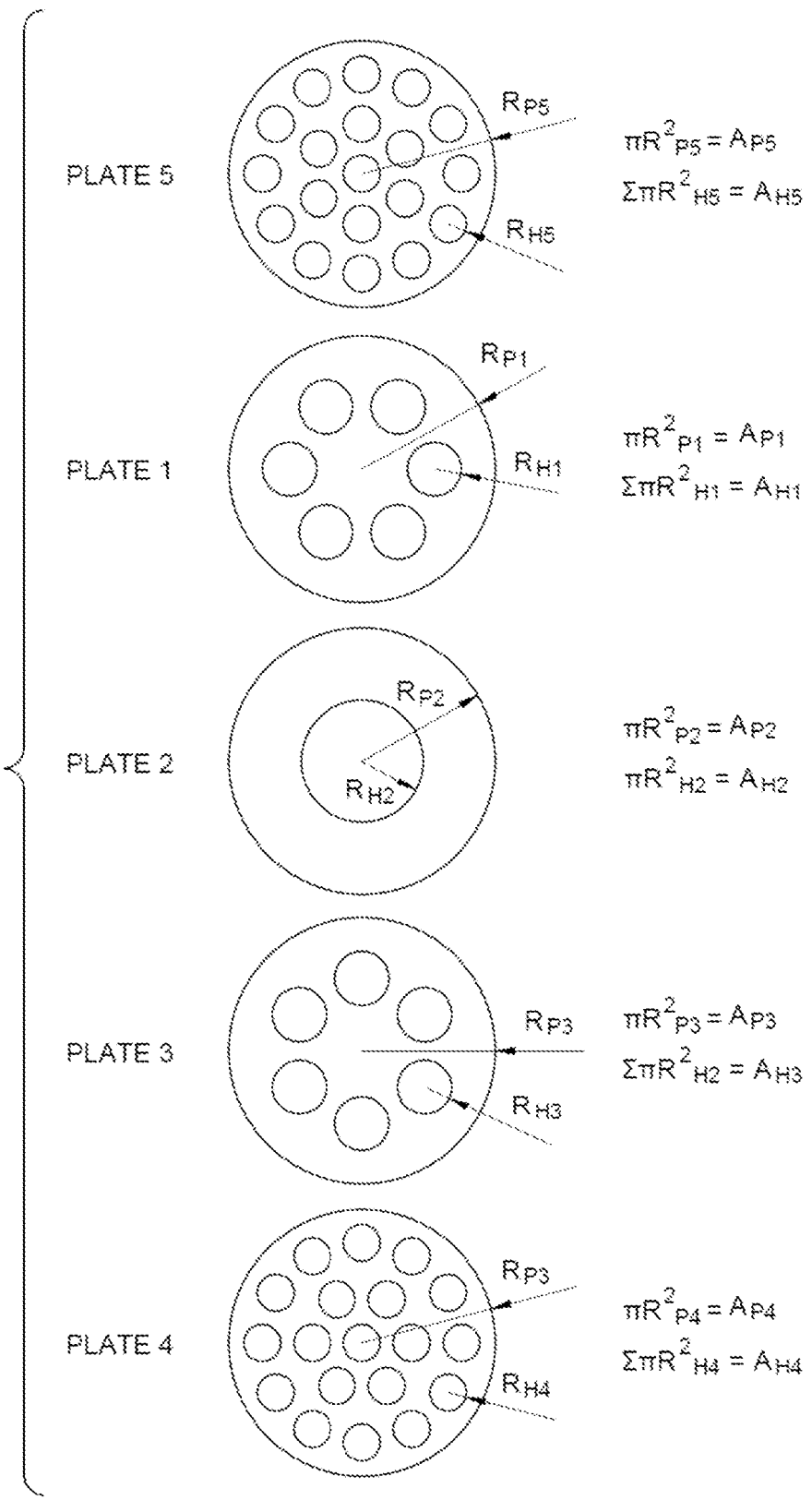

MIXER/FLOW DISTRIBUTORS

PRIORITY

The present application claims priority to U.S. Ser. No. 61/578,086 filed on Dec. 20, 2011, entitled, "Mixer/Flow Distributors" the entire disclosure of which is hereby incorporated by reference herein.

FIELD OF THE INVENTION

The invention relates to mixer/flow distributors and their use, e.g., in regenerative reactors. The invention encompasses a process and apparatus for controlling oxidation, e.g., for thermally regenerating a reactor, such as a regenerative, reverse-flow reactor.

BACKGROUND OF THE INVENTION

Combustion can be used for regenerating reactors utilized for cyclic, high temperature chemistry, e.g., regenerative reactors. Typically, regenerative reactor cycles are either symmetric (reaction chemistry is the same as regeneration chemistry) or asymmetric (reaction chemistry and regeneration chemistry are different).

One class of asymmetric regenerative reactors, e.g., those utilized for pyrolysis, comprises first and second zones, with each zone comprising at least one regenerative bed. The reactor is heated (or regenerated) in an exothermic oxidation step, e.g., by conducting fuel and oxidant to a mixing-distribution zone located between the first and second zones, mixing and distributing the fuel and oxidant in the mixing-distribution zone, combusting the fuel and oxidant, and then conducting the combustion products through the second zone and away from the reactor. During the pyrolysis step, a pyrolysis feed is conducted through the second zone and then through the first zone, thereby pyrolysing the pyrolysis feed and conveying heat from the second zone to the first zone. Some regenerative reactors deliver fuel and/or oxidant directly to the mixing-distribution zone without having those streams pass through the first or second zones. Prior art references disclose introducing fuel and/or oxidant via nozzles, distributors, or burners that penetrate the reactor system using means generally perpendicular to the reaction flow direction and usually through the reactor vessel side wall. For example, during the exothermic step in a conventional Wulff cracking furnace, air flows axially through the regenerative bodies, and fuel is introduced via nozzles that penetrate the side of the furnace, to combine with air (combusting and releasing heat) in an open zone between regenerative bodies.

One feature of a regenerative reactor is to execute reactions at high efficiency by recuperating product heat directly into feeds. Introducing fuel or oxidant radially via nozzles, distributors, or burners external to the reactor is disadvantageous because the regenerative reactor system is not utilized to preheat that reactant stream. In other words, bypassing some fraction of the fuel and/or oxidant around the regenerative reactor system reduces the reactor system's efficiency.

Attempts have been made to introduce fuel and/or oxidant to a location at or near the middle of the regenerative reactor via conduits that are positioned axially within one or more of the regenerative beds. For example, U.S. Pat. No. 4,240,805 discloses using pipes that are positioned axially within a regenerative bed to carry oxidant (air) to locations near the middle of the regenerative flow path. This conveys heat toward the reforming zone. More recently, U.S. Pat. No. 7,815,873 discloses providing fuel and oxidant, via substantially parallel flow paths within the first zone, to a mixer-distributor located in a mixing-distributing zone. The mixing-distributing zone is located between the first and second regenerative zones, and the mixer-distributor comprises convergence and divergence zones to improve the reactor's thermal efficiency.

Further improvements are desired.

SUMMARY OF THE INVENTION

In an embodiment, the invention relates to a regeneration method, comprising:
(a) conducting fuel through at least one first conduit and oxidant through at least one second conduit, the first and second conduits being located in a recuperation zone of a reactor system;
(b) combining and reacting at least a portion of the fuel with at least a portion of the oxidant in a mixing-distributing zone to produce heat and a first reaction product, the mixing-distributing zone being located (i) in the reactor system and (ii) downstream of the recuperation zone and upstream of a reaction zone, the mixing-distributing zone comprising a mixer-distributor having an MD≤15.0%, a pressure drop ≤0.3 bar (absolute), and a combined fuel-oxidant flow rate ≥10.0 kg/hr; and
(c) conducting the reaction product through the reaction zone and transferring at least a portion of the heat from the reaction product to the reaction zone.

In yet another embodiment, the invention relates to a hydrocarbon conversion process, comprising:
(A) providing fuel and oxidant to a reactor, the reactor comprising at least one mixer-distributor;
(B) transferring the fuel and oxidant to the mixer-distributor in a fuel-oxidant flow-direction;
(C) mixing and distributing the fuel-oxidant flow in the mixer-distributor and exothermically reacting at least a portion of the oxidant with at least a portion of the fuel sufficient to heat at least a portion of the reactor to a temperature ≥800° C., the mixer distributor comprising:
  (i) at least one first baffle and a plurality of first orifices, the first baffle and plurality of first orifices being positioned at a first location in the mixer-distributor;
  (ii) at least one second baffle and at least one second orifice, the second baffle and second orifice being located at a second location in the mixer-distributor, wherein (a) the first location is upstream of the second location with respect to the fuel-oxidant flow, and (b) the first location has a greater number of orifices than the second location; and
  (iii) an inner boundary of the mixing-distributing zone, the inner boundary being either (a) connected to the first baffle's perimeter and the second baffle's perimeters or (b) sufficiently proximate to the first and second baffles' perimeters to substantially prevent the fuel-oxidant flow through the mixing-distributing zone except via the first and second orifices;
(D) providing a first mixture to the heated reactor in a direction that is substantially the reverse of the fuel-oxidant flow direction, the first mixture comprising alkane; and
(E) exposing the first mixture to a temperature ≥800° C. in the heated reactor and abstracting sufficient heat from the reactor to convert at least a portion of the first mixture's alkane to unsaturated hydrocarbon.

BRIEF DESCRIPTION OF THE DRAWINGS

FIG. 4 schematically shows the plate surface area and total perforation surface area for plates 1-5.

DETAILED DESCRIPTION OF THE PREFERRED EMBODIMENTS

Figure 1:
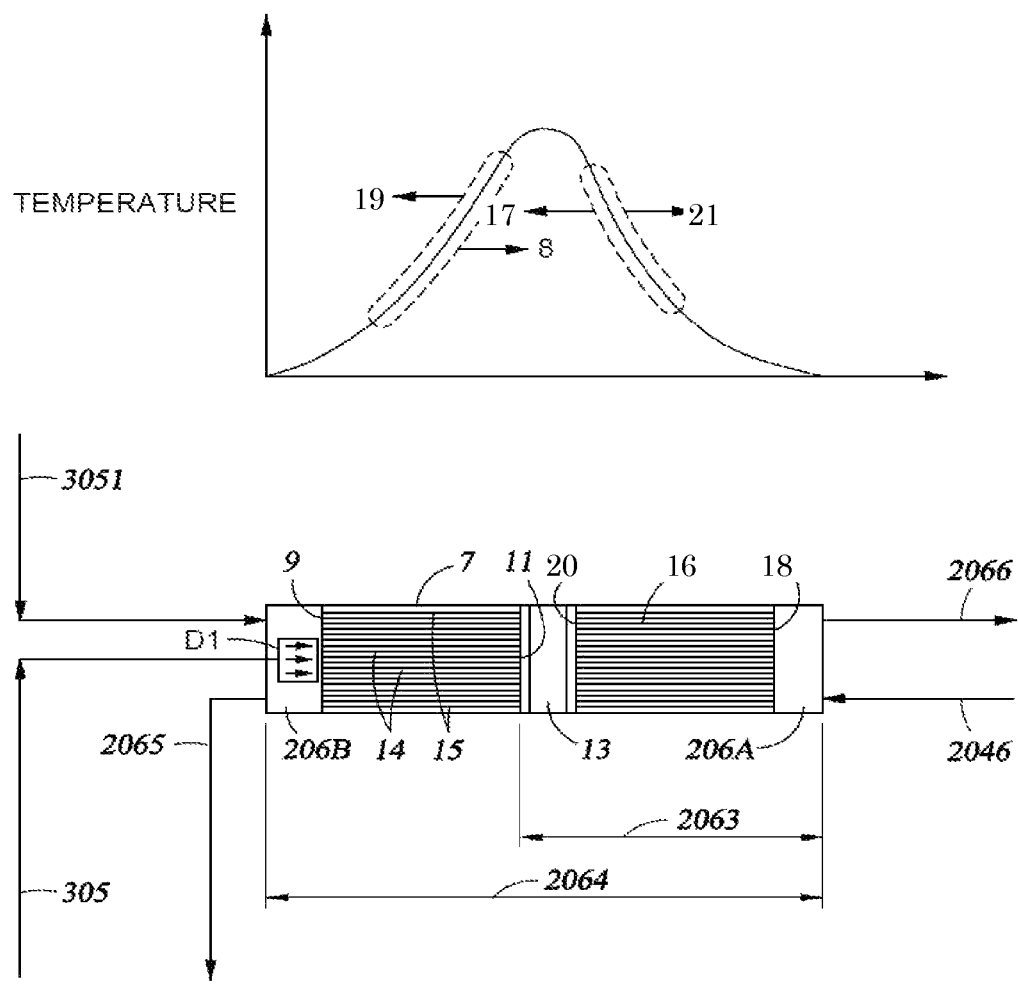
FIG. 1 schematically shows one embodiment of the invention utilizing a regenerative, reverse-flow pyrolysis reactor.

The invention is based in part on the observation that mixing and distribution effectiveness can be improved by utilizing a mixer-distributor comprising a plurality of orifices located within the mixing-distributing zone. In one embodiment, the mixer-distributor's orifices comprise a plurality of holes open to the flow of fuel and oxidant, the holes being located on one or more planes within or proximate to the mixing-distributing zone. For example, the holes can be (i) located on one or more plates within mixing-distributing zone, (ii) located on one or more protrusions of the mixing-distributing zone's boundary (e.g., toward a central portion of the zone), or (iii) a combination of arrangements (i) and (ii). The plates and/or protrusions can be, e.g., substantially parallel, and can be spaced apart with substantially equal interplate spacing within the mixing-distributing zone.

It has been found that utilizing mixer-distributors comprising an arrangement of orifices as specified below provides improved mixing and distribution compared to mixer-distributor utilizing convergence-divergence zones, e.g., those described in U.S. Pat. No. 7,815,873, particularly at an L:D ratio ≤3.0, e.g., ≤2.0, such as in the range of 0.5 to 1.5. The term "L:D ratio" has the same meaning as in U.S. Pat. No. 7,815,873, which is incorporated by reference herein in its entirety.

It has also been found that conventional mixer-distributors, e.g., those comprising convergence-divergence zones, are sensitive to (a) gas-flow variations and (b) axial misalignment between (i) the reactor components and (ii) the mixer-distributor components. It has been discovered that mixer-distributors comprising an arrangement of orifices (e.g., in the form of plurality of substantially-parallel perforated plates) are significantly less sensitive to such gas-flow variations and mixer-distributor misalignment. Utilizing the mixer-distributor in a reverse-flow regenerative pyrolysis reactor system results in a significant increase in efficiency over reactor systems utilizing conventional mixer-distributors. Since mixing and flow-distribution is improved, the regeneration step utilizes less fuel and oxidant than would a conventional mixer-distributor to achieve the same amount and uniformity of reactor heating. Moreover, when the fuel and pyrolysis feed are obtained from the same hydrocarbon source, less fuel usage during the regeneration step makes more of the hydrocarbon available for conversion to $C_2$ unsaturates, thereby increasing overall yield.

In an embodiment, the mixing-distributing zone is located between the first and second reactors of a regenerative reactor system, with each reactor comprising, e.g., at least one regenerative bed. The mixer-distributor, which comprises a plurality of orifices, is located within the mixing-distributing zone.

The mixing-distribution zone can be of appropriate cross-sectional shape for convenient use in a regenerative reactor system, e.g., polygonal (triangular, rectangular, pentagonal, hexagonal, etc.), circular, elliptical, etc., including combinations thereof. The orifices can be, e.g., perforations in one or more baffle means, the baffle means comprising a plurality of plates and/or protrusions of the mixing-distributing zone's boundary. The baffle means substantially prevent the flow of reactants (e.g., fuel and/or oxidant) through the mixing-distributing zone except via the orifices. This can be accomplished, e.g., by locating the perimeter of the baffle means in proximity to the mixing-distributing zone's inside boundary in order to substantially prevent the flow of fuel and/or oxidant via flow-paths which substantially avoid at least some of the mixer-distributor's orifices. By substantially prevent, it is meant that less than 10% (by weight), e.g., <5%, of the flow of fuel and/or oxidant avoids at least some of the mixer-distributor's orifices.

One embodiment will now be described with respect to a mixing-distributing zone having a length L and cross-sectional area A, where (i) "length" is defined in a direction parallel to the average flow of fuel and oxidant traversing the mixing-distributing zone from upstream to downstream and "cross-sectional area" is defined with respect to a plane that is substantially perpendicular to L. The mixing-distributing zone 13 is located within a regenerative, reverse-flow reactor system, e.g., the reactor system illustrated in FIG. 1. The mixing-distributing zone's cross-sectional area can be, e.g., (i) substantially constant over L and/or (ii) substantially the same as that of the first reactor 7 and/or second reactor 1, as shown in FIG. 1. Zones 16 and 7 each comprises at least one regenerative bed, where the term "regenerative bed" means a reactor bed comprising material that is effective in storing and transferring heat. In this embodiment, at least one mixer-distributor is located within the mixing-distributing zone, the mixer-distributor comprising at least two perforated plates. The length L of the mixing-distributing zone 13 is typically taken as the distance in between the regenerative beds of zones 16 and 7, that is, the distance from the downstream end of the regenerative bed in zone 7 to the upstream end of the regenerative bed in zone 16, with downstream being with respect to the flow of fuel and oxidant. Although the invention is described in terms of perforated plates located within such a mixing-distributing zone, the invention is not limited thereto, and this description is not meant to foreclose other embodiments within the broader scope of the invention, such as embodiments where the mixing-distributing zone has a different shape, where the mixing-distributing zone has an irregular cross-sectional area, where at least some of the orifices are not located on plates within the mixing-distributing zone, etc.

The invention is not limited to embodiments having one mixer-distributor. For example, in one embodiment first reactor 7 is a honeycomb in the form of an elongated rectangular body having upstream and downstream faces of substantially equal rectangular cross-sections. The honeycomb comprises four sections $S_1$-$S_4$ joined side-to-side, the sections each being honeycombs in the form of an elongated rectangular body having upstream and downstream faces of substantially equal rectangular cross-sections. In this embodiment, each section can comprise fuel passages and oxidant passages. The use of multiple honeycomb sections (as in $S_1$-$S_4$) facilitates the application to large-diameter reactor systems. In some embodiments, each section utilizes one mixer in region 13 to facilitate mixing of the first and second reactants that are flowing predominantly through the passages in that section. In those embodiments, there may be roughly the same number of mixers as there are sections. In large-diameter reactors, the number of sections may be very large, numbering in the dozens or even hundreds. For example, in one embodiment, the reactor system comprises (i) a first reactor comprising 100 sections and (ii) one mixer per section.

For the purpose of this description and the appended claims, the term "perforated plate" means a solid body having orifices open to the flow of gases, the solid body having a thickness ("T"), a cross-sectional area ("A"), effective plate diameter ("$D_p$", with $D_p=2(A/\pi)^{1/2}$), and a $T/D_p$ ratio $\leq 1.0$, e.g., $\leq 0.5$, such as $\leq 0.2$. Plate thickness T is the average plate thickness proximate to a perforation (or the arithmetic mean of these values when the thickness proximate to one orifice differs from the thickness proximate to another). For example, supporting means that may be attached to a plate for positioning the plate in the mixing-distributing zone (e.g., rings and/or tabs for connecting a plate to the mixing-distributing zone's boundary) are excluded from the plate thickness. One or more of a plate's features (e.g., location of perforations) can be conveniently described in reference to a central axis. A plate's central axis is defined as a line that is substantially perpendicular to the plane of the plate that intercepts the plate's geometric center ("centroid"), where the term centroid means the average location (first moment) of all the points of the object. For example, the centroid of a circular plate of uniform density is the point at the center of the circle. Two or more plates can be positioned in approximately coaxial fashion, where the term "coaxial" means that the central axes of the plates are (i) in close proximity and (ii) substantially parallel. In this context, the term "close proximity" means the plates' central axes are separated by a distance that is $\leq 10\%$ of the plate's effective diameter (or the effective diameter of the smaller plate when the plates are of unequal size), e.g., $\leq 5\%$. The term "substantially parallel" means that the difference in angle of interception to any of the planes of the plates is $\leq 10°$, e.g., $\leq 5°$. The central axis of a plurality of plates, called the common central axis, is the best fit (e.g., numerical average) of the plates' central axes.

In an embodiment, the mixer-distributor comprises two perforated plates. For example, the mixer can comprise:
(a) a first plate having (i) a cross-sectional area $A_{p1}$ (ii) a thickness $T_{p1}$, and (iii) a plurality of orifices having a combined cross-sectional area $A_{h1}$, and
(b) a second plate, the second plate having (i) a cross-sectional area $A_{p2}$, (ii) a thickness $T_{p2}$, and (iii) one substantially-centered orifice having a cross-sectional area $A_{h2}$.

Plate 2 can be located proximate to a plane (Plane 2) that is substantially orthogonal to the direction of flow and bisecting the mixing-distributing zone 13, and plate 1 can be located proximate to a plane (Plane 1) that is (i) substantially parallel to Plane 2 and (ii) located upstream of Plane 2 with respect to the average flow of fuel and oxidant as these traverse the mixing-distributing zone. Planes 1 and 2 can be spaced apart to provide an L:D ratio (for the mixer-distributor of this embodiment) in the range of 0.1 to 10.0, e.g., in the range of 0.2 to 2.0, such as in the range of 0.5 to 1.5, L being (for this embodiment) measured between the downstream end of the regenerative bed in zone 7 to the upstream end of the regenerative bed in zone 1 along the central axis. Optionally, the plates are substantially coaxial, the ratio $A_{p1}:A_{h1}$ is $\geq 2.0$ and the ratio $A_{p2}:A_{h2}$ is $\geq 1.5$. $A_{h2}$ is optionally in the range of 75.0% of $A_{h1}$ to 125.0% of $A_{h1}$, e.g., 85.0 of $A_{h1}$ to 115.0% of $A_{h1}$, such as 90.0% of $A_{h1}$ to 110.0% of $A_{h1}$. While not wishing to be bound by any theory or model, it is believed that making $A_{h1}$ and $A_{h2}$ of substantially similar size leads to lower pressure drop across the mixer-distributor and lessens the variation in reactant (fuel and oxidant) flow velocities among the orifices. The total number of orifices (e.g., perforations) located on plate 1 is optionally in the range of 2 times to 8 times the number of orifices located on plate 2, e.g., in the range of from 3 times to 6 times. For a plate having an effective diameter $D_p$, the plate's thickness can be determined from the relationship $T/D_p \leq 0.5$, such as $\leq 0.2$. Optionally, plate 2 has a thickness $T_{p2}$ that is in the range of 75.0% of $T_{p1}$ to 125.0% $T_{p1}$, e.g., in the range of 90.0% of $T_{p1}$ to 110.0% of $T_{p1}$, such as in the range of 95.0% of $T_{p1}$ to 105.0% of $T_{p1}$. Optionally, the downstream face of plate 1 is spaced apart from the upstream face of plate 2 by a distance $S_{p1-p2}$, wherein $S_{p1-p2}$ is measured along the mixer-distributor's central axis and is in the range of 5% to 50% of plate 1's $D_p$, such as in the range of 5% and 20%. When plates 1 and 2 are of substantially equal perimeter, $S_{p1-p2}$ can be in the range of $0.25 S_b$ to $5.0 S_b$, where $S_b$ equals $A_{h1}$ divided by the perimeter of plate 1. The mixer-distributor is generally located coaxial with the mixing-distributing zone. When the mixer-distributor's effective length is less than that of the mixing-distributing zone, the mixer-distributor is optionally centered in the zone along the central axis. Optionally, $A_{p2}$ is in the range of 75.0% of $A_{p1}$ to 125% of $A_{p1}$, e.g., 85.0% of $A_{p1}$ to 115% of $A_{p1}$, such as 90.0% of $A_{p1}$ to 110.0% of $A_{p1}$. In an embodiment, plates 1 and 2 have substantially the same surface area and thickness, e.g., they are circular or polygonal plates of substantially equal diameter and thickness.

In the embodiment illustrated in FIGS. 3A-3C and FIG. 4, the mixer-distributor comprises a plurality of perforated plates, e.g., at least two perforated plates. For example, the mixer-distributor can comprise:
(a) at least one first plate, the first plate having a cross-sectional area $Ap_1$ and having a plurality of orifices having a combined cross-sectional area $A_{h1}$, wherein $A_{p1}:A_{h1}$ is $\geq 2.0$; and
(b) a second plate, the second plate having (i) fewer orifices than the first plate, (ii) a cross-sectional area $A_{p2}$ is in the range of about 75.0%·$A_{p1}$ to 125.0%·$A_{p1}$, and (iii) one substantially-centered orifice having a cross-sectional area $A_{h2}$, wherein $A_{h2}$ is in the range of about 90%·$A_{p1}$ to 110.0%·$A_{p1}$.

Figure 3A:
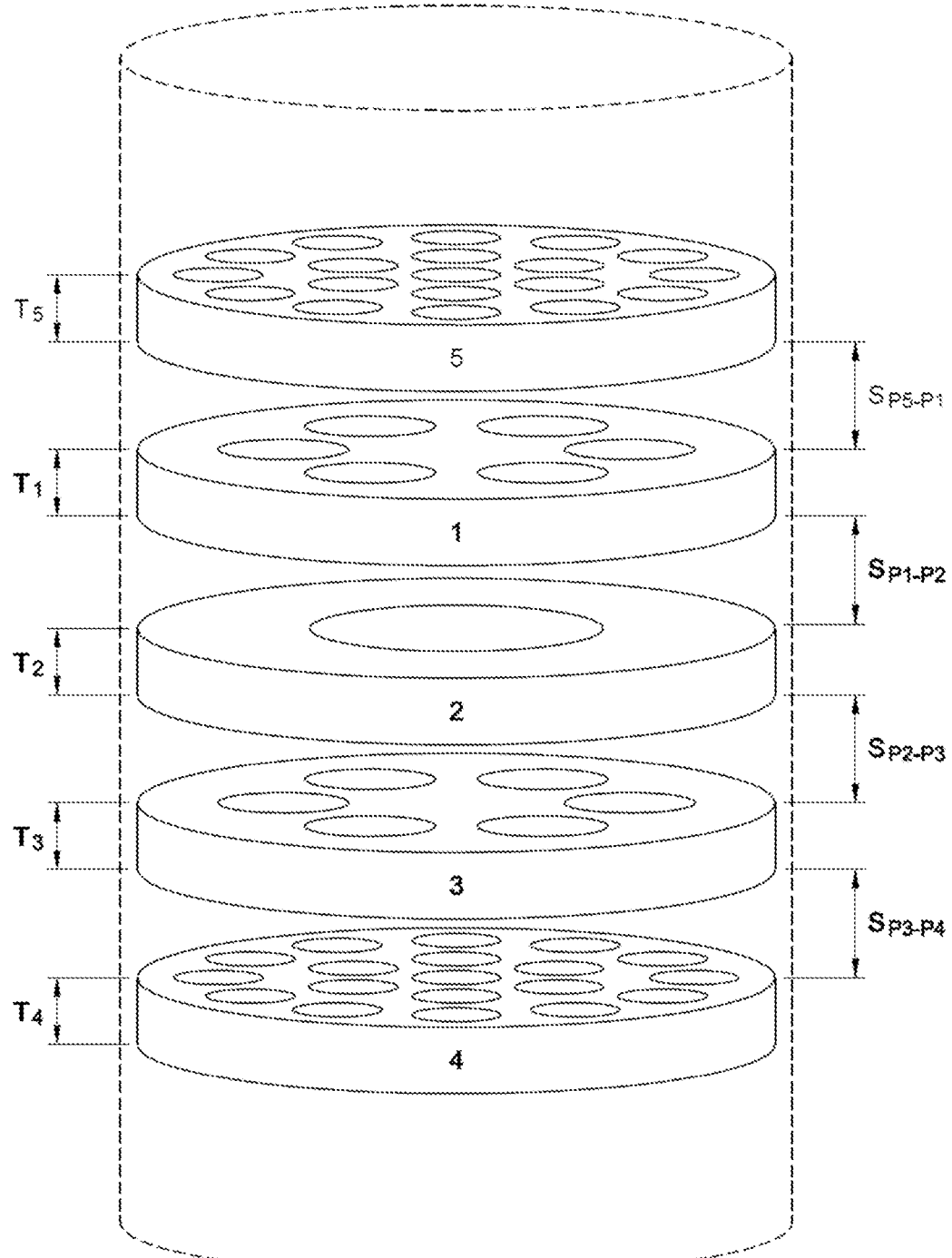
FIG. 3A schematically illustrates a mixer-distributor comprising five perforated plates.

Optionally, the mixer distributor further comprises third, fourth, and/or fifth perforated plates. As shown in FIG. 3A, plate 3 is adjacent to the side of plate 2 that is opposite to plate 1, plate 4 is located adjacent to the side of plate 3 that is opposite plate 2, and plate 5 is adjacent to the side of plate 1 that is opposite plate 2. Optionally, the plates comprising the mixer-distributor have one or more of the following features:
(i) at least one of the plates has a polygonal, elliptical, circular cross-section;
(ii) at least two of the plates have a substantially equal cross-sectional area;
(iii) the orifices through each of the plates (which orifices comprise the perforations) have a polygonal, elliptical, or circular cross-section or a combination thereof;
(iv) at least two of the plates have substantially the same thickness;
(v) at least one plate has a thickness that is not the same as those of the other plates;
(vi) at least one plate has a substantially uniform thickness;
(vii) at least one plate has a substantially non-uniform thickness, such as when one or more of the plates comprises embossed perforations, e.g., one or more orifices having a thickness that is not the same as that of the plate;
(viii) the mixer-distributor comprises at least three plates of substantially equal spacing;

(ix) the mixer-distributor comprises at least three plates of unequal spacing, such as when the spacing between plates 1 and 2 (denoted as $S_{p1-p2}$ in FIG. 3A) is not the same as the spacing between plates 2 and 3 (denoted as $S_{p2-p3}$); or (x) a spacing between the last downstream plate of the mixer and the upstream end of the regenerative material in second reactor 1 denoted as $S_{z1}$ that is approximately equal to the spacing between the first upstream plate and the downstream end of the regenerative material in first reactor 7 denoted as $S_{z7}$.

The mixer-distributor can further comprise additional mixing distribution elements, e.g., plates, swirling means, flow concentrators, flow expanders, etc., as described in U.S. Pat. No. 7,815,873. Optionally, the mixer-distributor includes means for decreasing (e.g., preventing) the flow of the fuel and/or oxidant in paths that avoid the plates' orifices. For example, the mixer-distributor can be located proximate to the inner wall of mixing-distributing zone 13, to guide fuel and oxidant flow toward and through the mixture-distributor, and which substantially prevents the flow of these gases between zones 7 and 1 by other flow-paths.

One embodiment of a mixer-distributor will now be described in more detail, the mixer-distributor comprising perforated circular plates arranged as shown in FIG. 3A. Although the mixer-distributor is described in terms of this embodiment, the invention is not limited thereto, and this description is not meant to foreclose other embodiments, such as those having fewer plates, plates of non-circular cross-section area, unequal thickness, non-circular orifices, overlapping orifices, embossed orifices, etc.

In an embodiment, the first plate ("plate 1") is a substantially circular plate having a cross-sectional area $A_{p1}$ and a plurality of substantially circular orifices having a combined cross-sectional area $A_{h1}$, wherein $A_{p1}:A_{h1}$ is $\geq 2.0$. Optionally, the plate has one or more of the following properties: the plate has a cross-sectional area in the range of 500 mm$^2$ to $5.0\times10^6$ mm$^2$, e.g., 2000 mm$^2$ to $5.0\times10^4$ mm$^2$, such as 3000 mm$^2$ to $3.0\times10^4$ mm$^2$; the plate has a $T/D_p \leq 0.3$, such as in the range of 0.05 to 0.15; the plate has a substantially uniform thickness; each orifice has a cross-sectional area $\geq 0.01 \cdot A_{p1}$, e.g., in the range of $0.01 \cdot A_{p2}$ to $0.2 \cdot A_{p1}$; the plate does not contain an orifice having a central axis that is less than 0.1 $D_p$ distant from the plate's central axis at the plane of the plate; the plate's diameter is in the range of 25 mm to 2,500 mm, e.g., 50 mm to 250 mm, such as 65.0 mm to 200.0 mm.

Figure 3B:
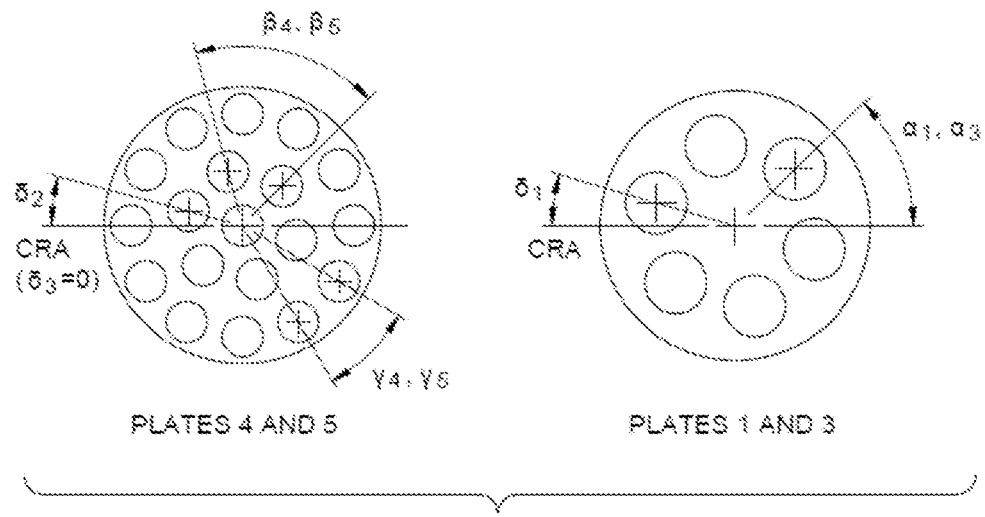
FIGS. 3B and 3C schematically show the spacing and angular relationships among the perforations of plates 1, 3, 4, and 5.
Figure 3C:
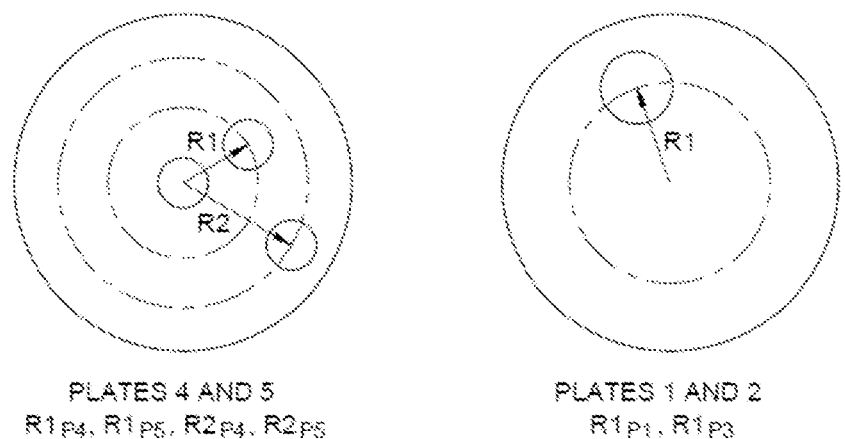

In an embodiment, the first plate comprises a plurality of non-overlapping, substantially circular orifices, with no orifice being located within 0.1 $D_p$ of the plate's central axis. Optionally, the number of orifices through plate 1 is equal to a factor "n" times the number of orifices through plate 2, with n being in the range of from 2 to 20, such as in the range of from 3 to 6. In an embodiment, the number of orifices is equal to 6. Optionally, each orifice is of substantially equal area, as shown in the right hand side of FIG. 3B, and of substantially equal thickness. Optionally, the orifices are equally-spaced in a circular pattern, the circular pattern having a radius $R1_{p1}$, as shown in FIG. 3C. $R1_{p1}$ is generally selected so that no orifice overlaps the plate's perimeter, and can be, e.g., in the range of $0.05 \cdot D_{p1}$ to $0.4 \cdot D_{p1}$. The spacing angle $\alpha_1$ can be determined from the number and diameter of the equally-spaced orifices. For example, $\alpha_1$ can be in the range of about 40.0° to about 120.0° when plate 1 comprises a number of equally-spaced, non-overlapping orifices in the range of from three to nine.

The second plate ("plate 2") is a substantially circular plate located adjacent to the first plate, as shown in FIG. 3A. In an embodiment, the second plate has (i) a cross-sectional area $A_{p2}$ in the range of $75.0\% \cdot A_{p1}$ to $125.0\% \cdot A_{p1}$, e.g., $90.0\% \cdot A_{p1}$ to $110\% \cdot A_{p1}$, and (ii) one substantially-centered circular orifice having a cross-sectional area $A_{h2}$, wherein $A_{p2}:A_{h2}$ is $\geq 1.5$. In other words, plate 2's central orifice can have a central axis that is separated (in the plane of the plate) by $\leq 0.1$ $D_p$, e.g., $\leq 0.05$ $D_p$, e.g., $\leq 0.01$ $D_p$, from the plate's central axis. Optionally, $A_{h2}$ is in the range $75.0\% \cdot A_{h1}$ to $125\% A_{h1}$, e.g., $85.0\% \cdot A_{h1}$ to $115\% \cdot A_{h1}$, such as $90.0\% \cdot A_{h2}$ to $110.0\% \cdot A_{h1}$. Optionally, plate 2's thickness and cross-sectional area are in the same ranges as those specified for plate 1. Optionally, plate 2 has substantially the same thickness, thickness uniformity, and cross-sectional area as plate 1. Optionally, the plate 2 contains one or more additional orifices. The additional orifices can have, e.g., a combined cross-sectional area $\leq 0.6 \cdot A_{h2}$.

Generally, plate 1 has a greater number of orifices than plate 2, with plate 2 having the fewest number of orifices among the mixer-distributor's plates (e.g., those of optional plates 3, 4, and 5 as shown in FIG. 3A). In an embodiment, the third plate ("plate 3") is a substantially circular plate located adjacent to plate 2, as shown in FIG. 3A. Plate 3 has a cross-sectional area $A_{p3}$ and a plurality of orifices having a combined cross-sectional area $A_{h3}$, wherein $A_{p3}:A_{h3}$ is $\geq 2.0$. Optionally, plate 3's properties, e.g., thickness, thickness uniformity, cross-sectional area, orifice number/size/geometry, etc., are in the same ranges as those specified for plate 1. Optionally, $A_{p3}$ is in the range of $75.0\% \cdot A_{p1}$ to $125.0\% \cdot A_{p1}$, e.g., $90.0\% \cdot A_{p1}$ to $110.0\% \cdot A_{p1}$, such as in the range of $0.10 \cdot A_{p1}$ to $[A_{p1}+(0.02 \cdot A_{p1})]$. In an embodiment, plate 3 comprises a plurality of non-overlapping orifices with no orifice overlapping a region that is within 0.1 $D_p$ of the plate's central axis. Optionally, the number of orifices through plate 3 is equal to a factor "m" times the number of orifices through plate 2, with m being in the range of from 2 to 20, such as in the range of from 3 to 6. In an embodiment, plate 3 has six substantially circular orifices. Optionally, each orifice is of substantially equal cross-sectional area, as shown in the right hand side of FIG. 3B, and is of substantially equal thickness. Optionally, the orifices are equally-spaced in a circular pattern, the circular pattern having a radius $R1_{p3}$, as shown in FIG. 3C. $R1_{p3}$ is generally selected so that no orifice overlaps the plate's perimeter, and can be, e.g., in the range of $0.5 \cdot D_{p3}$ to $0.4 \cdot D_{p3}$. The spacing angle $\alpha_3$ can be determined from the number and diameter of the equally-spaced orifices. For example, $\alpha_3$ is approximately 60.0° when plate 3 comprises six equally-spaced, non-overlapping orifices. In an embodiment, plate 3 is substantially the same as plate 1 (e.g., with n=m).

When plates 1 and 3 each comprise a plurality of equally-spaced orifices, the orifices' patterns of plates 1 and 3 can be aligned within a relative rotational position. In such embodiment, each plate may have different rotational orientation, where the rotation is around the plate's central axis. Relative rotational position of one plate versus another is conveniently described in reference to a plane that includes the common central axis, and is bordered by the common central axis (exists on one side of that axis only). The intersection of this reference plane with each plate provides a common reference axis ("CRA"), shown as a horizontal line in FIG. 3B, from which angles of rotation can be measured. Relative rotational position of an orifice on a plate is defined as the angle ("δ") between the reference axis and a radial line that links the centroid of the plate with the centroid of the orifice nearest to the reference axis. If a plate has orifices at substantially different radii, each set of orifices that have substantially similar radii may have their own δ. When angles require addition or subtraction, we follow the convention that positive angles from the reference axis are on the counter-clockwise side of the reference axis as viewed along the common central axis, observing from the side of plate 1 that is opposite from plate 2 (i.e., from "above" plate 5 as illustrated in FIG. 3A). In an embodiment where plates 1 and 3 each have three to nine (e.g., six) circular orifices of substantially equal diameter, and wherein $R1_{p1}=R1_{p3}=R_1$, the relative rotational position of plates 1 and 3 ($\delta_1$) is in the range of −30.0° to 30.0° with respect to the (horizontally drawn) common reference axis as shown in FIG. 3B.

In an embodiment, the mixer-distributor can further comprise optional plate 4. As shown in FIG. 3A, plate 4 is a circular plate located adjacent to plate 3 so that plate 3 is between plates 4 and 2. In an embodiment, plate 4 has (i) a cross-sectional area $A_{p4}$, where $A_{p4}$ is in the range of 75%·$A_{p1}$ to 125.0%·$A_{p1}$, e.g., 90.0%·$A_{p1}$ to 110.0%·$A_{p1}$ (ii) a plurality of orifices having a combined cross-sectional area $A_{h4}$, wherein $A_{p4}$:$A_{h4}$ is ≥2.0, and (iii) a number of orifices greater than that of plate 3. Optionally, plate 4's thickness and cross-sectional area are in the same ranges as those specified for plate 3. Optionally, plate 4 has substantially the same thickness, thickness uniformity, and cross-sectional area as plate 2. Optionally, plate 4's orifices each have a cross-sectional area in the range of 0.01·$A_{p4}$ to 0.2·$A_{p4}$. Optionally, the plate has an orifice having a cross-sectional area overlapping the plate's central axis. Optionally, the plate has an orifice having a center that is located substantially on the plate's symmetry axis.

In an embodiment, plate 4 is of substantially uniform thickness $T_4$ and comprises a plurality of non-overlapping circular orifices with one orifice being located substantially coaxially with the plate's central axis. Optionally, the number of orifices through plate 4 is equal to a factor "p" times the number of orifices through plate 3, with p being in the range of from ≥2 or ≥3.0. In an embodiment, plate 4 has 19 circular orifices of substantially uniform thickness (substantially equal to that of the plate) and substantially equal cross-sectional area, as shown in the left hand side of FIG. 3B. With one orifice centered on the plate's symmetry axis, the remaining orifices can be, e.g., equally-spaced in first and second circular patterns, the first circular pattern having a radii $R1_{p4}$, and the second circular pattern having a radius $R2_{p4}$, as shown in FIG. 3C. $R1_{p4}$ is generally selected so that no orifice overlaps the plate's central orifice and $R2_{p4}$ is selected so that no orifice overlaps plate 4's perimeter. $R1_{p4}$ and $R2_{p4}$ can each be, e.g., in the range of 0.05·$D_4$ to 0.4·$D_{p4}$. The spacing angles $\beta_4$ and $\gamma_4$ can be determined from the number and diameter of the equally-spaced orifices as shown in FIG. 3C. $\beta_4$ can be, e.g., in the range of about 45.0° to about 90.0° when four to eight (e.g., six) equally-spaced, non-overlapping orifices are equally-spaced at $R1_{p4}$. $\gamma_4$ can be, e.g., in the range of about 22.5° to about 45.0°, when eight to sixteen (e.g., twelve) equally-spaced, non-overlapping orifices are equally-spaced at $R2_{p4}$.

In an embodiment, the mixer-distributor can further comprise optional plate 5. As shown in FIG. 3A, plate 5 can be a circular plate located adjacent to plate 1 so that plate 1 is between plates 5 and 2. Plate 5 can have (i) a cross-sectional area $A_{p5}$, where $A_{p5}$ is in the range of 0.10·$A_{p1}$ to [$A_{p1}$+ (0.02·$A_{p1}$)], (ii) a plurality of circular orifices having a combined cross-sectional area $A_{h5}$, wherein $A_{p5}$:$A_{h5}$ is ≥2.0, and (iii) a number of orifices greater than that of plate 1. Optionally, plate 5's properties, e.g., thickness, thickness uniformity, cross-sectional area, orifice number/size/geometry, etc., are in the same ranges as those specified for plate 4.

In an embodiment, plate 5 is of substantially uniform thickness $T_5$ and comprises a plurality of non-overlapping orifices with one orifice being located substantially coaxially with the plate's central axis. Optionally, the number of orifices through plate 5 is equal to a factor "q" times the number of orifices through plate 1, with q being in the range of from ≥2.0 or ≥3.0, e.g., such as in the range of from 3 to 6. In an embodiment, plate 5 has 19 circular orifices of substantially uniform thickness (substantially equal to that of the plate) and substantially equal cross-sectional area, as shown in the left hand side of FIG. 3B. With one orifice centered on the plate's symmetry axis, the remaining orifices can be, e.g., equally-spaced in first and second circular patterns, the first circular pattern having a radii $R1_{p5}$, and the second circular pattern having a radius $R2_{p5}$, as shown in FIG. 3C. $R1_{p5}$ is generally selected so that no orifice overlaps the plate's central orifice and $R2_{p5}$ is selected so that no orifice overlaps plate 5's perimeter. $R1_{p5}$ and $R2_{p5}$ can each be, e.g., in the range of 0.05·$D_{p5}$ to 0.4·$D_{p5}$. The spacing angles $\beta_5$ and $\gamma_5$ can be determined from the number and diameter of the equally-spaced orifices as shown in FIG. 3C. $\beta_5$ can be, e.g., in the range of about 45.0° to about 90.0 when four to eight (e.g., six) equally-spaced, non-overlapping orifices are equally-spaced at $R1_{p5}$. $\gamma_5$ can be, e.g., in the range of about 22.5° to about 45.0°, when eight to sixteen (e.g., twelve) equally-spaced, non-overlapping orifices are equally-spaced at $R2_{p5}$.

In an embodiment where plates 4 and 5 each have two rings of orifices, the inner ring with six and the outer ring with 12 roughly evenly spaced orifices, the relative rotational position of the inner ring of 6 orifices on plates 4 and 5 ($\delta_2$) is in the range of −30.0° to +30.0° with respect to the (horizontally drawn) common reference axis (CRA) as shown in FIG. 3B, and the relative rotational position of the outer ring of 12 orifices on plates 4 and 5 ($\delta_3$) is in the range of −15.0° to +15.0° with respect to the (horizontally drawn) common reference axis (CRA) as shown in FIG. 3B. The two rings of orifices on plates 4 and 5 can have a relative rotational position with respect to each other ($|\delta_2-\delta_3|$) between 0.0° and 15.0°. In an embodiment, the two rings of orifices on plates 4 and 5 have a relative rotational position with respect to each other ($|\delta_2-\delta_3|$) between 12.0° and 15.0°. Plates 4 and 5 can have a relative rotational position with respect to plates 1 and 3 ($|\delta_1-\delta_2|$) in the range, e.g., of 0.0° to 30.0°. In one embodiment, the rotational position of plates 4 and 5 relative to plates 1 and 3 ($|\delta_1-\delta_2|$) is in the range of 0.0° and 5.0°. In one embodiment, the rotational position of plates 4 and 5 relative to plates 1 and 3 ($|\delta_1-\delta_2|$) is in the range of 25.0° and 30.0°. In one embodiment, the rotational position of plate 3 relative to plate 4 and of plate 5 relative to plate 1 are fixed as outlined above, but the relative rotational positions of the plate 3-4 pair and the plate 1-5 pair is not fixed at any specific value.

In an embodiment, the mixer-distributor further comprises optional swirling means. Such swirl means, when used, can provide, e.g., a swirl number in the range of from 0.1 to 3.0, e.g., 0.1 to 1.3, the swirl number can be determined using the methods described in Combustion Aerodynamics, Chapter 5, by J. M. Beer, Krieger Publishing, 1983. Although the mixer-distributor of the invention is less sensitive to misalignment between the bed of recuperator zone 7 and the mixer-distributor of zone 13, it has been observed that this sensitivity can be further reduced when swirling means are located between plate 1 and plate 2 (plate 1 being upstream of plate 2 with respect to the average flow direction of the fourth mixture).

Figure 5:
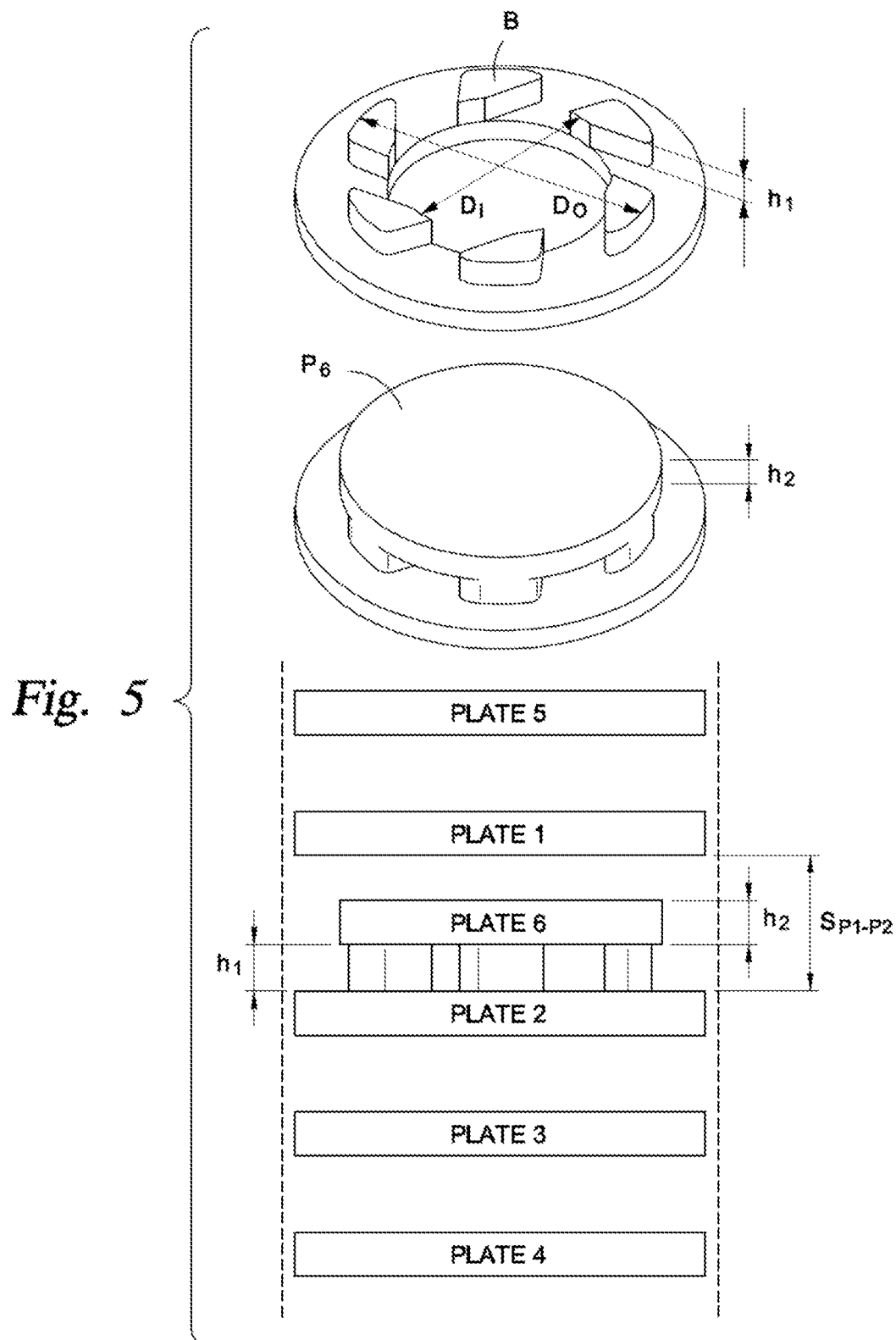
FIG. 5 schematically shows swirling means located adjacent to plate 2.

When swirling means are utilized, the fuel and oxidant mixing is aided by the radial flow of these gases into a chamber defined by swirl vanes B as shown in FIG. 5. The swirl vanes direct the fuel and oxidant (and any reaction product) radially inward, while imparting a circumferential velocity.

Swirling gases pass through the orifice of plate 2, thereby increasing the amount of mixing.

Although shown in FIG. 5 as six radially-slanted fins, a different number of swirl vanes (B) can be used, and these vanes may be configured in other shapes effective for producing swirl, provided that the swirl created by the swirl generating devices (the swirl vanes in this embodiment) produce a swirl number ranging from about 0.1 to about 3.0, e.g., from about 0.1 to about 1.3, the swirl number being specified at the entrance to the orifice of plate 2. Alternative swirl-generating passage shapes can be used, e.g., conventional swirl-generating passage shapes, though the invention is not limited thereto. For example, helical passages or spaces can be utilized between vanes.

An example of swirling means useful for the mixer-distributor is shown schematically in FIG. 5. Swirling blocks shaped to achieve the designated swirl number are equally-spaced proximate to the upstream surface of plate 2. The swirling blocks can have, e.g., a height $h_1$, wherein $h_1 \le S_{p1-p2}$, where $S_{p1-p2}$ is the spacing between plates 1 and 2, as shown in FIG. 3A. The minimum distance between opposed swirling blocks is $D_i$, where $D_i$ is ≥1.0 times the minimum distance spanning plate 2's central orifice. A baffle (e.g., a plate 6) can be located upstream of the swirling means and downstream of plate 1, as shown in FIG. 5. In an embodiment, the swirling blocks are equally spaced along a curve equidistant between $D_i$ and an outer diameter $D_o$, with plate 6 being a circular plate having an outside diameter $D_o$ and a thickness $h_2$. Optionally, plate 2, the swirling blocks, and plate 6 are attached in face-to-face contact, one to the other in sequence, as shown in FIG. 5.

In an embodiment, the mixer-distributor is configured to minimize its open volume while maintaining sufficient mixing to mix (i) ≥50.0 wt. % of the first reactant, e.g., ≥75.0 wt. %, such as ≥90.0 wt. % with (ii) ≥50.0 wt. %, e.g., ≥75.0 wt. %, such as ≥90.0 wt. % of the second reactant, the weight percents being based on the weight of the first or second reactant (as the case may be) conveyed to zone 13. The term "open volume" means the total volume of the mixer-distributor, including optional plates 3, 4, and 5 and optional swirling means when these are used, less the volume of the material structure of the mixer-distributor. For example, the mixer-distributor can have a length L and an effective diameter D, wherein (i) the effective diameter $D=2(A/\pi)^{1/2}$, and (ii) A is the mixer-distributor's cross-sectional area. In this embodiment, L and D are selected to achieve sufficient mixing and distribution of the fuel and oxidant within zone 13 while minimizing open volume. Optionally, L/D is in the range of 0.1 to 8.0, e.g., in the range of 0.2 to 2.0, such as in the range of 0.3 to 1.0. Optionally, the mixer-distributor has a total volume that is ≤20.0%, e.g., ≤15.0%, such as ≤10.0% of the combined volume of the recuperator zone 7, reaction zone 1, and mixing-distributing zone 13.

For prior art mixer-distributors, such as those of U.S. Pat. No. 7,815,873, the total volume of the mixer-distributor is selected based on balancing (i) effectively mixing the fuel and oxidant in the mixing-distributing zone; (ii) uniformly distributing the flow of the combined fuel and oxidant across the cross-section represented by the ends of the (circular or polygonal) cylinder represented by the mixer-distributor; and (iii) providing a relatively low pressure-drop across the mixing zone. The mixer-distributor of the invention is an improvement, at least in part because the perforated plates comprising the mixer-distributor of the invention provide enhanced fuel-oxidant mixing and flow distribution of these gases without significantly increasing pressure drop—particularly at a relatively small mixer-distributor L/D, e.g., in the range of 0.2 to 2.0, such as in the range of 0.3 to 1.0. To achieve the same level of mixing, distribution, and pressure drop, prior art mixer-distributors would require a mixer-distributor length L that is ≥10.0%, e.g., ≥25.0% than the length L of the mixer-distributor of the invention of the same effective diameter D. The term "Mixing Effectiveness" (ME) is the amount (wt. %) of the fourth mixture's fuel component consumed via oxidation by the fourth mixture's oxidant component within and proximate to zone 13, the weight percent being based on the weight of the fourth mixture's fuel component. Optionally, ME is ≥75.0 wt. %, e.g., ≥95.0 wt. %, such as ≥99.0 wt. %. Optionally, the mixer distributor has a pressure drop during mixing of the fuel and oxidant that is ≤0.3 bar (absolute), e.g., ≤0.1 bar, such as ≤0.05 bar. Optionally, the mixer distributor has a pressure drop during oxidation and pyrolysis stages that is ≤50%, such as ≤20%, e.g. ≤10% of the overall pressure drop in the reactor (zones 1, 13, and 7) during these stages.

For the mixer-distributor of the invention, the mixing-distributing zone's volume is primarily determined by the thicknesses of the perforated plates (specified above) and the inter-plate spacings. When the mixer comprises plates of approximately the same cross-section, cross-sectional area, thickness, perimeter (P) and total orifice surface area ($A_h$), the inter-plate spacings are generally in the range of $0.25 S_B$ to $5.0 S_B$, where $S_B$ equals $A_h$ divided by P. Optionally, inter-plate spacing is in the range of $0.05 \cdot D_p$ and $0.50 \cdot D_p$, such as in the range of $0.05 \cdot D_p$ and $0.20 \cdot D_p$. Optionally, plate to bed spacings ($S_{z1}$, $S_{z7}$) are between 100% and 300%, e.g., between 100% and 200% of the inter plate spacings. Optionally, L=T+I, where T is the total of the plate thicknesses (each plate thickness being as specified above) and I is the total spacing, which is the sum of the inter-plate and plate-to-bed spacings. Optionally, the total spacing is divided equally among the inter-plate and plate-to-bed spaces in the mixing-distribution zone, e.g., in a three-plate mixer, the spacing between plates 1 and 2 and between plates 2 and 3 and $S_{z1}$ and $S_{z7}$ are each equal to 0.25*I. Optionally, the plates of the mixer-distributor are approximately centered in zone 13, e.g., the distance $S_{z7}$ between the upstream plate of the mixer-distributor and the downstream end of the regenerative material in first reactor 7 is substantially the same as distance $S_{z1}$ between the downstream plate of the mixer-distributor and the upstream end of the regenerative material in second reactor 1.

Besides being effective for fuel-oxidant mixing, the mixer-distributor is effective for the substantially uniform distribution of gas flow in directions perpendicular to the average flow direction of fuel and oxidant in zone 13. The term "substantially uniformly-distribution" refers to uniformity of axial gas velocity over the cross-sectional area that separates the mixer-distributor (zone 13) from zone 1 or zone 7. The axial direction is the direction perpendicular to the plane that divides the mixing zone 13 from either zone 1 or zone 7. Typically the axial direction is parallel to the common central axis, and in Cartesian coordinates is referred to herein as the "z" direction. Each element of cross-sectional area within the dividing plane can be evaluated for associated axial velocity, either by computational fluid dynamics or by experimental measurement. Substantially uniformly-distributed means that the flow Maldistribution value "MD" is ≤15.0%, e.g., ≤10.0%, such as ≤5.0%, wherein MD is equal to the (i) standard deviation of the axial velocity ($^\circ v_z$) divided by (ii) the mean axial velocity in the plane defined by the mixer-distributor's cross-section proximate to the downstream end of the mixing-distributing zone ($|\langle v_z \rangle|$), expressed as a percent. $^\circ v_z$ is equal to the square root of the variance of $v_z$, the variance and $|\langle v_z \rangle|$ being determined by measuring axial velocity at least 100 points of approximately equal spacing; the points being located on a plane within the mixer-distributor's cross-section that is proximate to the downstream end of the mixing-distributing zone. Optionally, the mixer-distributor also provides for a uniform temperature distribution proximate to the downstream end of the mixing-distributing zone, as characterized by a Temperature Variability ("TV"), with TV≤60.0° C., e.g., in the range of from 1.0° C. to 60.0° C., such as in the range of from 10.0° C. to 50.0° C. TV is equal to the standard deviation of the gas temperature measured over the mixer-distributor's cross-sectional area in a plane proximate to the downstream end of the mixing-distributing zone. The standard deviation of the gas temperature is equal to the square root of the gas temperature's variance, the variance being determined by measuring temperature at least 100 points (locations) of approximately equal spacing; the points being located on a plane within the mixer-distributor's cross-section that is proximate to the downstream end of the mixing-distributing zone. The term "variance" is as defined in Experiments in Modern Physics, Chapter 10: "The Elements of the Theory of Statistics", p. 446; Academic Press 1966.

It should be appreciated that the mixer-distributor can be substantially symmetric about the cross-section of plate 2, e.g., functioning substantially similar for reverse flow operation of the first and second mixtures. Although the mixing function of the mixer-distributor does not play a process role in the reverse flow, the configuration of the mixer-distributor in the reverse flow direction benefits from the substantially unimpeded flow of the first and second mixtures (e.g., a low pressure drop across zone 13) while providing for relatively uniformly distributed first and second mixture as it exits the mixer-distributor zone 13 toward recuperator zone 7.

Parameters such as (i) MD, (ii) TV, (iii) the amount of the fourth mixture's fuel component that is consumed via oxidation by the fourth mixture's oxidant component in the mixer zone, and (iv) the mixer-distributor pressure drop during operation depend at least in part on the mass flow rates of the fuel and oxidant. Although the single mixer-distributor, as described in FIGS. 3A-C and 4 can be used as the sole mixing element within the reverse-flow reactor, it can be desirable to utilize a plurality of such mixer-distributors operating in parallel in order to lessen the fraction of reactor-system volume handled by each of the mixer-distributors, particularly in very large reactor systems. Such a plurality of mixer-distributors is described in U.S. Pat. No. 7,815,873, for example. When extended sets of multiple-parallel segments (with respect to the average flow direction of the fourth mixture) are utilized, each of these segments can comprise, e.g., individual mixer-distributors such as those described above and illustrated in FIGS. 3A-C, 4, and 5. For example, individual mixer-distributors sections can be shaped with hexagonal external cross-sectional shape for ease of packing in large arrays.

The mixer-distributor is generally constructed or fabricated of a material able to withstand the high temperatures expected to be experienced in the reaction zone. In an embodiment, the mixer-distributor means is constructed from a material able to withstand temperatures ≥1.20×10$^{3}$° C., e.g., ≥1.60×10$^{3}$° C., such as ≥2.0×10$^{3}$° C. For example, one or more of plates 1-3, optional plates 4 and 5, optional swirling means, and optional baffle plate 6 are constructed ceramic material(s) such as one or more of silica, alumina, zirconia, silicon carbide, silicon nitride, yttria, etc.

Use in a Reactor System

In an embodiment, the mixer-distributor is utilized in a reverse-flow, regenerative bed reactor system. Such reactor systems can be used for operating (e.g., continuously or semi-continuously) a two-step asymmetric cycle reaction, e.g., a cycle comprising an oxidation (regeneration) step and an endothermic reaction step. Suitable reactor systems include, those described in U.S. Patent App. Pub. No. 2007/0191664, U.S. Pat. No. 7,491,250; U.S. Patent App. Ser. No. 61/349, 464; and U.S. Patent App. Pub. Nos. 2007/0144940 and 2008/0142409, all of which are incorporated by reference herein in their entirety. An example of a representative reverse-flow, regenerative bed reactor system is depicted in FIG. 1. The term "reactor" means equipment and combinations thereof for chemical conversion, including reactor combinations and systems such as disclosed in U.S. Pat. No. 7,943,808, which is incorporated by reference herein in its entirety. The reactor comprises three zones, a first ("recuperator") zone 7, a mixing-distributing zone 13, and a second ("reaction") zone 16. Zones 16 and 7 each comprises at least one regenerative bed, where the term "regenerative bed" means a reactor bed comprising material that is effective in storing and transferring heat. In an embodiment, the regenerative beds comprise bedding or packing material, such as glass or ceramic beads or pheres, metal beads or spheres, ceramic (including, e.g., alumina, silica, yttria, zirconia, etc., and mixtures thereof) or metal honeycomb materials, ceramic tubes, extruded monoliths, catalysts, etc. The first and second reactor beds can be of the same shape and size, but this is not required. In this embodiment, zone 13 comprises the mixer-distributor of FIGS. 3A-C and 4, including optional components such as plates 3, 4, and 5; swirling means; baffle plate 6, etc.

In an embodiment, at least one of the first or second reactor beds comprises a honeycomb monolith. Honeycomb monoliths include, e.g., extruded porous structures such as those that are used for automotive catalytic converters, etc. The term "honeycomb" means a a solid body having multiple flow paths or passages located therein, the honeycomb passages having a passage length (T), passage cross-sectional area (A), an effective passage diameter ($D_{psg}$, with $D_{psg}=2(A/\pi)^{1/2}$), and a $T/D_{psg}$ ratio ≥1.0, such as ≥10.0. The analogous $T/D_{psg}$ for for the mixer-distributor's orifices is <1.0, this feature being useful for distinguishing the mixer-distributor's plates from the honeycombs of zones 16 and 7. Although honeycombs can have a circular cross-section, this is not required, and the term is not limited to any particular monolithic structure, shape, or topology. In embodiments where a honeycomb monolith is used the honeycomb monolith is believed to enable low pressure loss transference while providing contact time and heat transfer.

The reactor system is heated for the endothermic, e.g., pyrolysis, step with at least a portion of the heat utilized by the endothermic being provided by the oxidation step. In the embodiment of FIG. 1, the heating can occur in exothermic reaction region 2063, which can be located, e.g., between a first point proximate to the downstream end 11 of first reactor 7 and a second point proximate to the downstream end 18 of second reactor 16; "downstream" in this case being with respect to the average flow of fuel and oxidant.

At least one mixer-distributor is located in zone 13, e.g., the mixer-distributor of FIG. 5. A first reactant, comprising, e.g., fuel, and a second reactant, comprising, e.g., an oxidant such as air, are generally conducted to a location proximate to the upstream side of plate 5 ("upstream" being with respect to the average flow direction of the first and second reactants in the reactor). The first and second reactants are distributed and mixed, e.g., as they traverse plate 5's orifices, and the combined reactants together with any oxidation products are then conducted through the orifices of plates 1-4, for further mixing, distribution, and reaction of the second reactant's components.

The oxidation step generally results in a high temperature zone in the reactor system's temperature profile, at least a portion of the high temperature zone being located in region 2063. The temperature profile is illustrated schematically as a Gaussian-like shape in FIG. 1.

The oxidation step thus includes the following features: (i) heating of zone 13 and the second reactor 16 by transferring at least a portion of the heat of combustion to the reactor system downstream of the end 11 of the first reactor 7 and (ii) by transferring at least a portion of the sensible heat recovered by the first and second reactants in an upstream region of the first reactor (upstream with respect to the flow of the first and second reactants) toward one or more of the downstream region of the first reactor, region 13, or the second reactor in order to thermally regenerate the reactor system. Accordingly, at least a segment of each of the right-hand and left-hand edges of the temperature profile translate downstream from their starting locations at the beginning of the oxidation step, as shown in FIG. 1 by arrows 21 and 8 After the reactor system is heated, the flow-direction of gases traversing the reactor system is reversed for the pyrolysis step.

The Pyrolysis Step

At the start of the pyrolysis step, reaction zone 16 is at an elevated temperature and the recuperator zone 7 is at a lower temperature than the reaction zone 16. A first mixture (the reactant feed, e.g., a pyrolysis feed) is introduced via a conduit 2046, into a first end 18 of the reaction zone 16.

In the embodiment of FIG. 1, the pyrolysis region 2064 can be located, e.g., between a first point proximate to the upstream end 18 of the second reactor 16 and a second point proximate to the downstream end 9 of first reactor 7, "upstream" and "downstream" being with respect to the average flow of the first mixture. It should be appreciated that the invention can be practiced without precisely defining (a) the boundaries of regions 2063 and 2064. Although region 2063 (the exothermic reaction region) is at least partially coextensive with pyrolysis region 2064, the upstream end of region 2063 ("upstream" with respect to the average flow of the fourth mixture) is generally proximate to the location where sufficient fuel and oxidant combine to produce an exothermic reaction. The downstream (with respect to the average flow of the first mixture) end of region 2063 is generally proximate to the downstream end of second reactor 16 as shown in FIG. 1, though this is not required, and in at least one embodiment the downstream end of region 2063 is located further downstream, e.g., in conduit 2066. In at least one of the embodiments represented by FIG. 1, the upstream end of pyrolysis region 2064 is proximate to the upstream end 18 of the second reactor 16. The downstream end of pyrolysis region 2064 can be, e.g., proximate to the downstream end 9 of the first reactor 7. Optionally, a major amount (e.g., >50%) of the heat abstracted from the reactor system during the pyrolysis occurs in the portion of region 2064 that is coextensive with region 2063.

The pyrolysis can be conducted, e.g., under high-severity pyrolysis conditions. The term "high-severity" with respect to the pyrolysis of a feed comprising hydrocarbon, e.g., the first mixture, means pyrolysis operating conditions resulting in the conversion to acetylene of ≥10.0 wt. % of the feed's hydrocarbon based on the total weight of hydrocarbon in the feed. The pyrolysis can be conducted under thermal pyrolysis conditions, e.g., high-severity thermal pyrolysis conditions, where the term "thermal pyrolysis" means <50.0% of the heat utilized by the pyrolysis is provided by (a) exothermically reacting the pyrolysis feed, e.g., by exothermically reacting an oxidant with hydrocarbon and/or hydrogen of the first mixture and/or (b) contacting the pyrolysis feed with the gaseous and/or liquid products of combustion to heat the pyrolysis feed. The term "thermal pyrolysis reactor" means a pyrolysis reactor wherein ≥50.0% of the heat utilized by the pyrolysis is provided by heat transfer from reactor components, e.g., solid surfaces associated with the reactor such as tubulars or bed materials; optionally ≥80.0% or ≥90.0% of the heat utilized by the pyrolysis is provided by such heat transfer.

In an embodiment, the first mixture is conducted to the pyrolysis stage 206 wherein it is exposed to a temperature ≥1.20×10³° C. under thermal pyrolysis conditions, e.g., high-severity, thermal pyrolysis conditions, to convert at least a portion of the first mixture to the second mixture. At least a portion of the second mixture, e.g., a vapor-phase portion which comprises $C_2$ unsaturates, molecular hydrogen, and saturated hydrocarbon, is conducted away from the reactor system, e.g., to an optional upgrading stage. A portion of the second mixture's combustible non-volatile portion can remain in the stage 206, e.g., as a deposit.

In an embodiment, the pyrolysis is conducted under high-severity thermal pyrolysis conditions, e.g., by exposing the first mixture to a temperature in the range of about $1.40 \times 10^{3}$° C. to about $2.30 \times 10^{3}$° C., e.g., in the range of about $1.45 \times 10^{3}$° C. to about $1.80 \times 10^{3}$° C. at a residence time ≤about 0.3 seconds, e.g., ≤0.05 seconds. Optionally, the residence time is ≤0.05 seconds, such as ≤0.02 seconds. Optionally, ≥25.0 wt. % (such as of the ≥50.0 wt. % or ≥75.0 wt. %) of the first mixture achieves a peak pyrolysis gas temperature ≥$1.40 \times 10^{3}$° C., e.g., in the range of about $1.50 \times 10^{3}$° C. to about $1.675 \times 10^{3}$° C., based on the weight of the first mixture. The term "peak pyrolysis gas temperature" means the maximum temperature achieved by the bulk pyrolysis stream gases as they travel through the pyrolysis reactor (e.g., cracking region or radiant region). One skilled in the art will appreciate that temperatures immediately proximate to a partition may be higher, and may, in some infinitesimal boundary layer, actually approach the solid temperature. However, the pyrolysis temperature referred to herein should be considered a bulk gas temperature, which is a temperature that could be measured by a device (such as a thermocouple) that is not in contact with the solid material.

In an embodiment, the pyrolysis is conducted for a time duration ($t_1$) sufficient for exposing ≥50.0 wt. %, e.g., ≥75.0 wt. %, such as ≥90.0 wt. % of the first mixture (based on the weight of the first mixture) to pyrolysis conditions for a residence time ≤about 0.3 seconds, e.g., ≤0.05 seconds. In an embodiment, $t_1$ is ≤20.0 seconds, e.g., ≤10.0 seconds, such as ≤5.0 seconds. Optionally, $t_1$ is in the range of 0.1 seconds to 10.0 seconds.

In an embodiment, the pyrolysis step includes one or more of the following conditions: the first mixture achieves a peak pyrolysis gas temperature ≥$1.40 \times 10^{3}$° C., e.g., in the range of $1.45 \times 10^{3}$° C. to $2.20 \times 10^{3}$° C., such as, $1.50 \times 10^{3}$° C. to $1.90 \times 10^{3}$° C., or $1.60 \times 10^{3}$° C. to $1.70 \times 10^{3}$° C.; a total pressure ≥1.0 bar (absolute), e.g., in the range of 1.0 bar to about 15 bar, such as in the range of 2.0 bar to 10.0 bar; a residence time (during high severity conditions) ≤0.1 seconds, e.g., ≤$5.0 \times 10^{-2}$ seconds, such as ≤$5.0 \times 10^{-3}$ seconds and/or a $t_1$ in the range of 0.1 seconds to 10.0 seconds.

Continuing with reference to FIG. 1, the first mixture abstracts heat from the reactor system, resulting in the derivation of the second mixture from the first by pyrolysis. As this step proceeds, a shift in the temperature profile occurs, e.g., a shift in at least a segment of the right-hand edge of the temperature profile (the segment being schematically encompassed by a dashed boundary for the purpose of illustration), the direction of the shift being indicated by arrow 17. The amount of this shift can be influenced by, e.g., the heat transfer properties of the reactor system. At least a portion of the second mixture, e.g., the portion in the vapor phase, is conducted from the downstream end 20 of the second reactor to the upstream end 11 of the first reactor 7, and is conducted away from the first reactor via conduit 2065 proximate to the downstream end 9, as shown. At the start of pyrolysis, the first reactor 7 has a temperature less than that of the second reactor 16. As the second mixture traverses the first reactor 7, the second mixture is quenched (e.g., cooled) to a temperature approaching that of the downstream end 9 of the first reactor. As the second mixture is quenched in the first reactor 7, at least a segment of the left-hand edge of the temperature profile moves toward the downstream end 9 of the first reactor 7 as indicated by arrow 19, the segment being schematically encompassed by a dashed boundary for the purpose of illustration. In at least one of the embodiments represented by FIG. 1, the upstream end of pyrolysis region 2064 is proximate to the upstream end 18 of the second reactor 16. The downstream end of pyrolysis region 2064 is proximate to the downstream end 9 of the first reactor 7. Since the quenching heats the first reactor 7, the oxidation step optionally includes cooling the first reactor, e.g., to shift at least a segment of the left-hand edge of the temperature profile away from end 9 of the first reactor 7, as illustrated schematically by arrow 8 in FIG. 1.

A first mixture useful in the pyrolysis step, and a second mixture that can be derived from the first mixture, will now be described in more detail.

First Mixture

In an embodiment, the first mixture comprises hydrocarbon and optionally further comprises molecular hydrogen and/or diluent. The type of hydrocarbon is not critical; e.g., the hydrocarbon can even compromise hydrocarbon non-volatiles, including those that are not in the gas phase at the temperature, pressure, and composition conditions subsisting at the inlet to the pyrolysis reactor.

In an embodiment, the hydrocarbon is derived from one or more source materials, e.g., natural gas, petroleum, etc. Examples of source materials comprising hydrocarbon include one or more of hydrocarbon derived from petroleum; syngas (a mixture comprising carbon monoxide and hydrogen); methane; methane-containing streams, such as coal bed methane, biogas, associated gas, natural gas, and mixtures or components thereof; synthetic crudes; shale oils; or hydrocarbon streams derived from plant or animal matter. Suitable hydrocarbon source materials include those described in U.S. Pat. Nos. 7,943,808 and 7,544,852, which are incorporated by reference herein in their entirety.

The first mixture can be derived from the source material(s) upstream of the pyrolysis, but this is not required. For example, in one embodiment hydrocarbon derived from a first source material and hydrogen derived from a second source material are conducted separately to the pyrolysis reactor, the hydrocarbon and hydrogen being combined to produce the first mixture proximate to (e.g., within) the pyrolysis reactor. Optionally, the hydrocarbon has (or is derived from one or more source materials having), e.g., a hydrogen content in the range of 6.0 wt. % to 25.0 wt. %, 8.0 wt. % to 20.0 wt. % (e.g., not natural gas), or 20.0 wt. % to 25.0 wt. % (e.g., natural gas).

Optionally, the first mixture further comprises diluent, e.g., ≥1.0 wt. % of diluent based on the weight of the first mixture. Suitable diluents (which can be a diluent mixture) include one or more of molecular hydrogen, oxygenate, such as water, nitrogen ($N_2$), hydrogen sulfide, $C_{4+}$ mercaptans, amines, mixtures of amines, non-hydrocarbon non-volatiles (whether combustible or not) including refractory inorganics, such as refractory oxygenates, inert gas (including inert gas mixtures), etc. In an embodiment, the first mixture comprises ≤10.0 wt. % diluent.

In an embodiment, the first mixture comprises a total amount of non-combustible non-volatiles (e.g., ash; ASTM D-189), from all sources, ≤2.0 parts per million weight (ppmw) based on the weight of the first mixture, e.g., ≤1.0 ppmw. Optionally, the first mixture comprises a total amount of combustible non-volatiles (e.g., tar, asphaltenes, ASTM D-6560) in the first mixture, from all sources, ≤5 wt. % based on the weight of the first of the hydrocarbon in the first mixture, e.g., ≤1.0 wt. %, such as ≤100.0 ppmw or ≤10.0 ppmw, provided the presence of the combustible non-volatiles does not result in ≥2.0 ppmw (e.g., ≥1.0 ppmw) based on the weight of the second mixture.

In an embodiment, the first mixture has one or more of the following properties: (i) at least 15.0 wt. % of the molecular hydrogen in the first mixture (based on the total weight of molecular hydrogen in the first mixture) is molecular hydrogen derived from the second mixture or one or more products thereof. In another embodiment, the first mixture comprises ≥50.0 ppm sulfur based on the weight of the first mixture.

In an embodiment, the first mixture has the following composition: (a) the first mixture comprises (i) ≥10.0 wt. % of hydrocarbon, e.g., ≥25.0 wt. % hydrocarbon and (ii) ≥1.0 wt. % molecular hydrogen, e.g., ≥15.0 wt. % molecular hydrogen, the weight percents being based on the weight of the first mixture and/or (b) the first mixture comprises (i) ≥0.10 mole % of hydrocarbon, e.g., in the range of 0.10 mole % to 90.0 mole % and (ii) ≥0.01 mole % of molecular hydrogen, e.g., in the range of 0.01 mole % to 90.0 mole %, the mole percents being per mole of the first mixture.

Second Mixture

In an embodiment, the second mixture comprises ≥1.0 wt. % of unsaturates and ≥1.0 wt. % of combustible non-volatiles, based on the weight of the second mixture. Optionally, the second mixture further comprises one or more of hydrogen, methane, ethane, or diluent, and optionally further comprises benzene, paraffin (iso-, cyclo-, and/or normal) having ≥3 carbon atoms, etc.

In an embodiment, a third mixture is derived from the second mixture in one or more upgrading/treatment stages, e.g., by separating from the second mixture one or more of hydrogen, methane, and/or combustible non-volatiles. In another embodiment, the third mixture comprises, consists essentially of, or consists of the second mixture, e.g., that part of the second mixture which is in the vapor phase at the downstream end of a regenerative, reverse-flow pyrolysis reactor.

Producing the second mixture from the first mixture by pyrolysis is an endothermic reaction, which withdraws heat from the pyrolysis reactor system. When the reactor system is cycled continuously or semi-continuously, at least a portion of the heat utilized by the pyrolysis steps is replaced by heat produced during the intervening oxidation steps, with one cycle of the reactor system comprising an oxidation step and a pyrolysis step. The oxidation (regeneration) step will now be described in more detail with reference to FIGS. 1 and 2.

The Oxidation Step

Regeneration entails transferring heat from (i) the mixing-distributing zone 13 and optionally (ii) from recuperator zone 7 to the reaction zone 16, to thermally regenerate the reactor system for a pyrolysis step. A fourth mixture (the regeneration gas, e.g., the combustion gas) is produced proximate to zone 13 by mixing and distributing the first and second reactants, e.g., fuel and oxidant. The first reactant (comprising fuel) is conducted to recuperator zone 7 via conduit 305. The second reactant (comprising oxidant) is conducted to recuperator zone 7 via conduit 3051. Optionally, first distribution means (D1) can be utilized for conducting the first reactant into fuel passages 14 and/or second distributor means (e.g., plenum 206B) can be utilized for conducting the second reactant into oxidant passages 15, the fuel passages and oxidant passages being located within recuperator zone 7. Since the fuel and oxidant passages are substantially independent flow paths (e.g., there is little or no fluid communication, one with the other) mixing of the first and second reactants generally does not occur until zone 13, where the first and second reactants combine to produce the fourth mixture. A fifth mixture, derived from at least in part from the oxidation of at least a portion of the fourth mixture's fuel component, is conducted away from the reactor system via plenum 206A and conduit 2066.

The first and second reactants exit recuperator zone 7, and combine in zone 13 to produce the fourth mixture. By keeping these reactants substantially separated upstream of zone 13, upstream with respect to the average flow of the first and second reactants, the heat (i) conveyed from the recuperator zone toward the regenerator zone and (ii) released during the exothermic reaction is directed towards regions of the reactor system that are beneficial for the pyrolysis. The term "substantially separated", means that $\leq 50.0$ wt. %, e.g., $\leq 25.0$ wt. %, of the first reactant's fuel component is consumed by reaction with the second reactant's oxidant component upstream of zone 13, based on the weight of the first reactant's fuel component conveyed to distributor (D1). In this manner, the majority of the heat release from the reaction of the fourth mixture's fuel and oxidant components will not take place until the gases have exited from the recuperator zone 7 into mixing-distributing zone 13. Optionally, passages 14 and 15 of recuperator zone 7 are oriented substantially parallel to the direction of the average flow of fuel and oxidant. Such passages are provided, for example, by regenerative beds comprised of extruded honeycomb monoliths, packing, stacked layers of corrugated materials, etc. When the recuperator zone 7 includes a packed bed or foam monolith materials (not shown), these bed materials should be configured to keep the first and second reactants substantially separated. Radial dispersion and the amount of first-reactant-second reactant mixing can be measured and/or calculated as described in U.S. Pat. No. 7,815,873.

Figure 2:
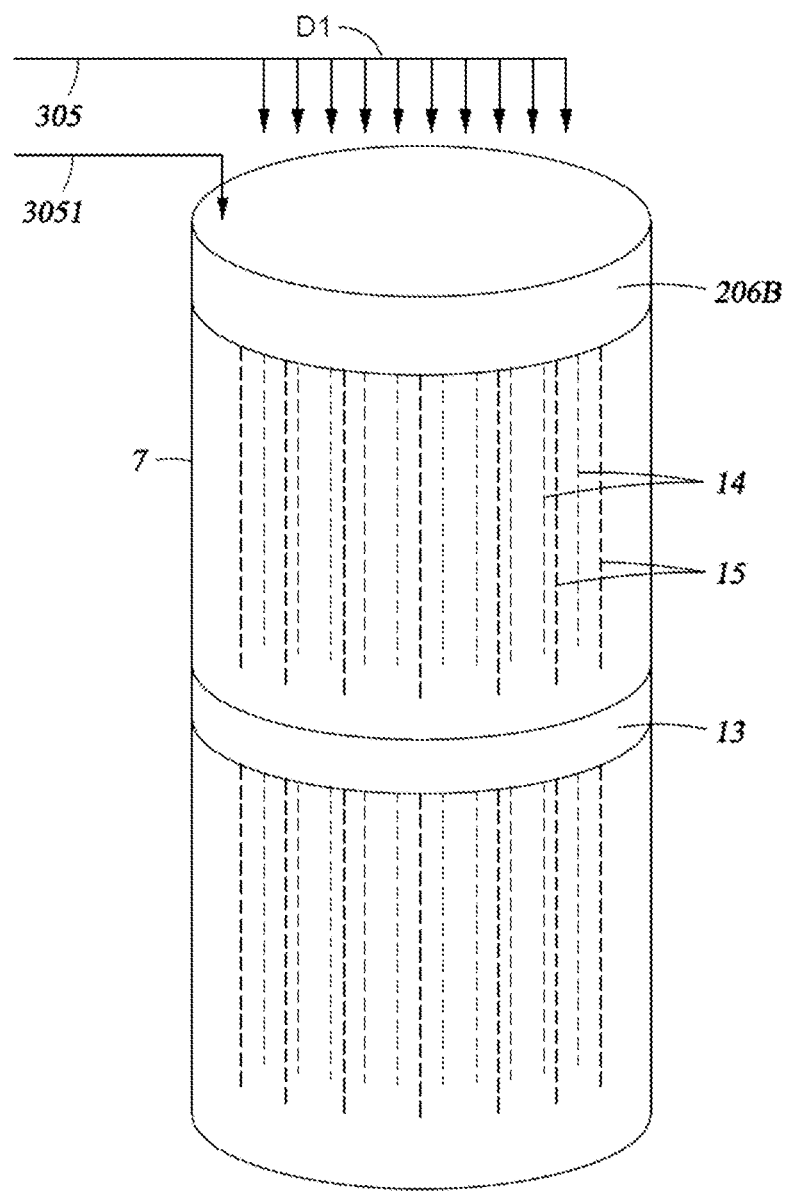
FIG. 2 schematically shows the locations of selected fuel passages and oxidant passages within reactor 7 of FIG. 1.
Figure 2A:
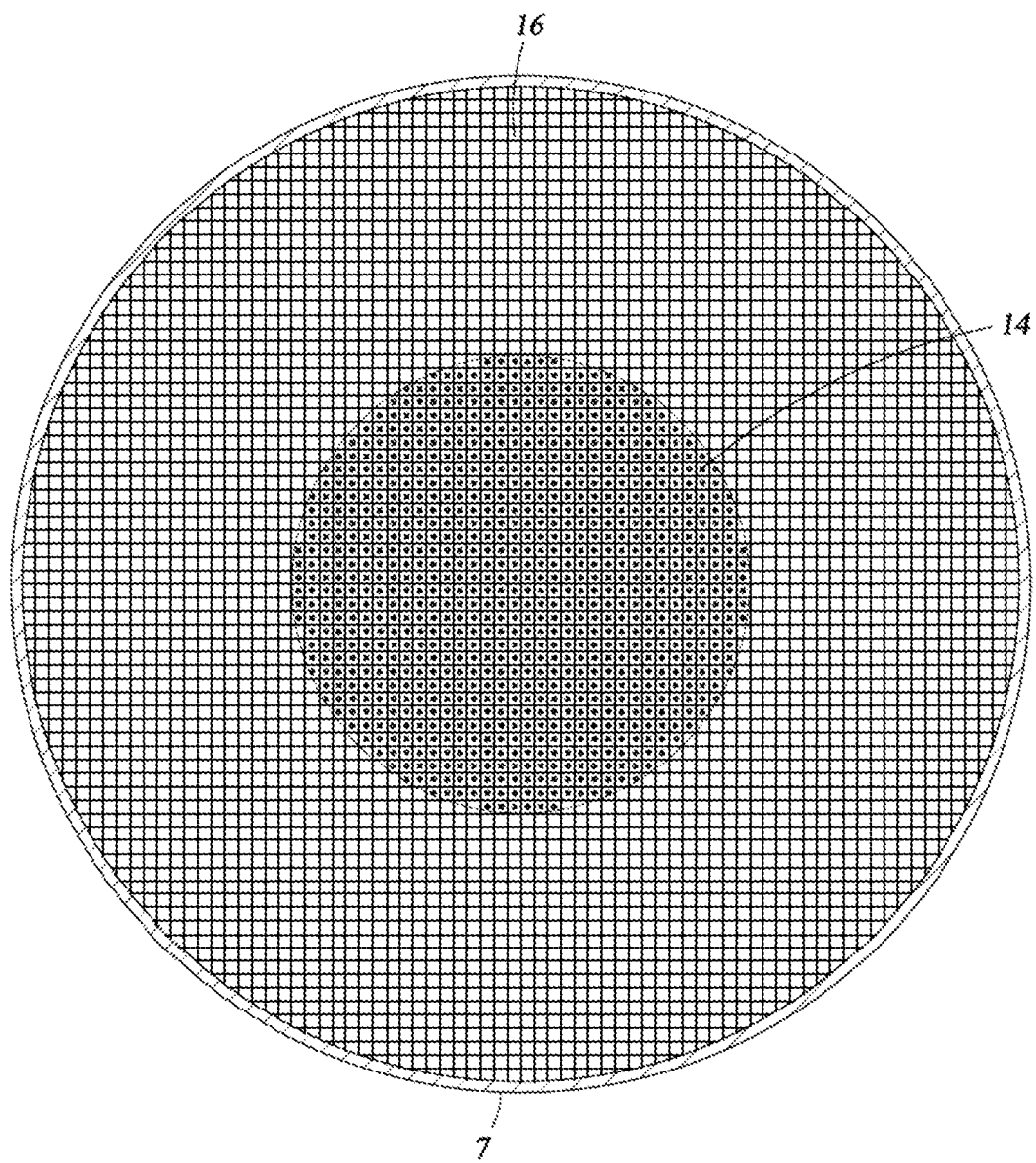
FIG. 2A schematically shows an end 9 of reactor 7, the shaded region showing the approximate location of fuel channels 14.

FIG. 2 schematically shows another view of the reactor system and its flow distributors. Distributor D1 (utilized to direct fuel into passages 14) has a plurality of apertures (shown as small arrows in FIGS. 1 and 2) aligned with passages 14. Plenum 206B provides for the flow of oxidant into passages 15. The apertures of D1 can be aligned with, but are not sealed to, the openings of channel 15. By not "sealing" D1's apertures to passages 14, passages 14 and 15 may be utilized during the reverse flow or reaction cycle, increasing the overall efficiency of the system. This "open" distributor (D1) can also be utilized in embodiment comprising multiple pyrolysis reactor systems, e.g., those where the reactor/recuperator beds move (e.g., rotate) in and out of a gas stream. FIG. 2A schematically shows an end view of reactor 7, with the shaded regions representing the approximate locations of distributor D1 (utilized to direct fuel into passages 14).

During the oxidation step, the first and second reactants transit the recuperator zone 7, abstracting at least a portion of the heat, stored in the recuperator zone from previous pyrolysis steps. The heated reactants are then introduced into zone 13 as shown in FIGS. 1 and 2. The mixer-distributor means produces the fourth mixtures by combining the first and second reactants emerging from recuperator zone 7, and then distributes the fourth mixture, particularly the fourth mixture's fuel and oxidant components to achieve a more uniform oxidation over the reactor system's cross-section upstream of reaction zone 16. The fourth mixture's oxidant component reacts with (i) the fourth mixture's fuel component and (ii) combustible non-volatiles located in the reactor system to produce a fifth mixture, which can further comprise unreacted fourth mixture, if any.

In this embodiment, the total duration of an oxidation step $t_2$ is greater than or equal to the time needed for the second reactor to abstract sufficient heat from the oxidation to accomplish the pyrolysis step. In other words, the oxidation step is conducted for a time duration greater than or equal to a time sufficient to displace the peak of the temperature profile toward the second reactor sufficient to heat the pyrolysis region 2064 for exposing the first mixture to a temperature $\geq 1.20 \times 10^{3 \circ}$ C. during the pyrolysis step. The value of $t_2$ depends on factors such as the geometry of the reactors utilized in stage 206, the heat transfer characteristics of the reactors and the materials from which the reactors are made, and the amount of heat needed by the pyrolysis step. Optionally, the $t_2$ is in the range of 0.1 seconds to 10.0 seconds. In an embodiment, $t_2$ is greater than or equal to the time needed to heat the pyrolysis region 2063 to a temperature sufficient for exposing $\geq 50.0$ wt. % of the first mixture, e.g., $\geq 75.0$ wt. %, such as $\geq 90.0$ wt. % to a temperature $\geq 1.20 \times 10^{3 \circ}$ C. during the pyrolysis step; the weight percents being based on the weight of the first mixture. In an embodiment, $t_2$ is $\leq 20.0$ seconds, e.g., $\leq 10.0$ seconds, such as $\leq 5.0$ seconds.

It is understood that flow control means (e.g., one or more of valves, rotating reactor beds, check valves, louvers, flow restrictors, timing systems, etc.) can be used to control gas flow, actuation, timing, and to alternate physical beds between the flow systems for the first, second, fourth, and fifth mixtures, and the optional purge gas when used between one or more of the steps. Suitable spargers, distributors, etc., are disclosed in U.S. Pat. No. 7,815,873; which is incorporated by reference herein in its entirety. Although the invention is compatible with the use of conventional spargers, distributors, plenums, etc., in stage 206, the invention is not limited thereto. The fourth and fifth mixture will now be described in more detail.

Fourth Mixture

The fourth mixture comprises first and second reactants. The first reactant can comprise, e.g., $\geq 10.0$ wt. % fuel based on the weight of the first reactant, such as $\geq 50.0$ wt. % fuel. The second reactant can comprise, e.g., $\geq 10.0$ wt. % oxidant based on the weight of the second reactant, such as $\geq 20.0$ wt. % oxidant. The fuel can be derived from the same source materials utilized for deriving the first mixture. Optionally, the fuel has substantially the same composition as the first mixture.

The fuel and oxidant can be the same as those disclosed in U.S. Pat. No. 7,943,808. Optionally, the fuel is derived from, comprises, consists essentially of, or consists of one or more of hydrogen, CO, methane, methane containing streams such as coal bed methane, biogas, associated gas, natural gas, and mixtures or components thereof, etc. Exothermically reacting the first reactant's fuel component and the second reactant's oxidant component provides at least a portion of the heat utilized by the pyrolysis, e.g., $\geq 50\%$, such as $\geq 75\%$, or $\geq 95\%$ of the heat utilized by the pyrolysis. Additional heat, when needed, can be provided to the regenerative, reverse-flow pyrolysis reactor by, e.g., a burner or furnace, e.g., a furnace external to the reactor but in thermal communication therewith. The first and second reactants mix within the regenerative, reverse-flow pyrolysis reactor to produce the fourth mixture, the fuel and oxidant then reacting, e.g., by an oxidation reaction such as combustion, as the fourth mixture traverses at least a portion of the pyrolysis reactor. The first reactant comprises fuel, e.g., molecular hydrogen, synthesis gas (mixtures of CO and $H_2$), or hydrocarbon, such as ≥10.0 wt. % hydrocarbon (including mixtures thereof), or ≥50.0 wt. % hydrocarbon, or ≥90.0 wt. % hydrocarbon based on the weight of the first reactant. The second reactant comprises oxidant, e.g., molecular oxygen.

The amount of oxidant in the second reactant and the relative amounts of first and second reactants utilized to produce the fourth mixture can be specified in terms of the amount of oxidant in the second reactant needed for oxidizing combustible non-volatiles in the reactor system ("X") and the amount needed for the substantially stoichiometric oxidation of the first reactant's fuel component ("Y"). In an embodiment, the total amount of oxidant in the fourth mixture is $Z(X+Y)$, wherein Z is in the range of 0.8 to 10.0, e.g., in the range of 1.0 to 3.0, and the amounts X and Y are on a molar basis. When Z>1.0, the excess oxidant can be utilized, e.g., for moderating the reaction temperature during the oxidation step as disclosed in U.S. Pat. No. 7,943,808, and/or for conveying heat within the reactor system.

The fourth mixture is generally produced in the mixing-distribution zone located downstream of the first reactor's channels. Although the fourth mixture is defined as the combination of first reactant and second reactant, the combined stream generally includes species resulting from the oxidation of combustible non-volatiles located in the first reactor's passages. Optionally, the combined stream further comprises species resulting from reaction of the first and second reactants in one or more of the first reactor's channels, or locations upstream thereof, as a result of commingling of the first and second reactants. Generally, the amount of commingling is small, as disclosed in U.S. Pat. No. 7,943,808. It can be beneficial for the amount of oxidant in the fourth mixture to exceed that needed to oxidize substantially all of the fourth mixture's fuel component, e.g., for (i) oxidizing combustible non-volatiles located in regions of the reactor system downstream of the first reactor's channels, (ii) moderating the temperature during the oxidation of the fourth mixture's fuel component, and/or (iii) transferring heat within regions of the reactor system downstream of the mixing-distribution zone. The desired amount of excess oxygen can be provided by increasing the relative amount of oxidant in the second reactant and/or by increasing the relative amount of second reactant in the fourth mixture.

Optionally, the fourth mixture further comprises diluent, e.g., ≥1.0 wt. % of diluent based on the weight of the fourth mixture. Suitable diluents (which can be a diluent mixture) include one or more of, e.g., oxygenate (water, carbon dioxide, etc.), non-combustible species such as molecular nitrogen ($N_2$), and fuel impurities such as hydrogen sulfide. In an embodiment, the fourth mixture comprises ≤96.0 wt. % diluent, e.g., in the range of 50.0 wt. % to 95.0 wt. % diluent, based on the weight of the fourth mixture. In an embodiment, diluent is provided to the fourth mixture as a component of the second reactant. For example, the second reactant can comprise 60.0 mole % to 95.0 mole % diluent and 5.0 mole % to 30.0 mole % oxidant per mole of the second reactant, such as when the second reactant is air. Optionally, the second reactant has a mass ratio of diluent to oxidant in the range of 0.5 to 20.0, e.g., in the range of 4.0 to 12.0. It can be beneficial for the second reactant (and fourth mixture) to further comprise diluent, e.g., for (i) moderating the temperature during the oxidation of the fourth mixture's fuel component and/or transferring heat within the reactor system.

In an embodiment, the first reactant comprises ≥90.0 wt. % molecular hydrogen based on the weight of the first reactant and the second reactant comprises ≥90.0 wt. % air based on the weight of the second reactant. When the second reactor comprises ≥90.0 wt. % air based on the weight of the second reactant, a fourth mixture produced from these can comprise, e.g., ≥1.0 wt. % molecular oxygen, e.g., in the range of 5.0 wt. % to 25.0 wt. %, such as 7.0 wt. % to 15.0 wt. %, ≥0.1 wt. % fuel, e.g., in the range of 0.2 wt. % to 5.0 wt. %, the weight percents being based on the weight of the fourth mixture, with the balance of the fourth mixture being molecular nitrogen diluent, e.g., ≥50.0 wt. % diluent, such as in the range of 60.0 wt. % to 94.50 wt. % diluent based on the weight of the fourth mixture.

In an embodiment, the mass flow rate of the fourth mixture during the oxidation step is ≥1.0 times the flow rate of the first mixture during the pyrolysis step, e.g., in the range of 1.0 to 6.0 times the flow rate of the first mixture during the pyrolysis step.

Fifth Mixture

The fifth mixture comprises (i) products derived from the exothermic reaction of the fourth mixture's fuel and oxidant with each other and with the combustible non-volatiles within the reactor, optionally (ii) diluent, when diluent is present in the fourth mixture, and/or (iii) unreacted fuel and oxidant. When the exothermic reaction of the fuel and oxidant involves hydrocarbon combustion, or when a diluent is present in the fourth mixture (such as $N_2$ or $H_2S$), the fifth mixture can comprise carbon dioxide, and can further comprise sulfur oxides, nitrogen oxides, etc.

EXAMPLES

Example 1

A regenerative, reverse-flow pyrolysis reactor is provided with a mixer-distributor of the invention. The reactor is cylindrically-symmetric and has the dimensions specified in the following table, with reference to FIGS. 3A-3C and FIG. 4. The mixer-distributor has five circular plates of substantially the same diameter and thickness, these values also being specified in table 1. The plates' orifices are circular holes with number and arrangement as shown in FIG. 4, and having the specified diameter and spacings.

TABLE 1

| Dimension | | Value |
|---|---|---|
| Bed Diameter | mm | 95.3 |
| Total Reactor Length | mm | 609 |
| Recuperator Bed (first reactor) Length | mm | 209 |
| Pyrolysis Bed (second reactor) Length | mm | 314 |
| Mixer Region Length | mm | 86.4 |
| Plate-to-Plate Spacing | mm | 9.53 |
| Plate 5-to-Bed Spacing | mm | 10.8 |
| Plate 4-to-Bed Spacing | mm | 10.8 |
| Plate Thickness | mm | 5.41 |
| Plate 4, 5 Hole Size | mm | 12.9 |
| Plate 1, 3 Hole Size | mm | 19.6 |
| Plate 2 Hole Size | mm | 52.1 |
| $\delta_2$ | deg | −15 |
| $\delta_1$ | deg | 15 |
| Plate 4, 5 R1 | mm | 20.1 |
| Plate 4, 5 R2 | mm | 40.0 |
| Plate 1, 3 R1 | mm | 29.2 |

During an oxidation step, a fourth mixture was produced downstream of the reactor's recuperator zone, the fourth mixture comprising 1.2 wt. % molecular hydrogen (fuel), 12.7 wt. % molecular oxygen (oxidant), and 86.1 wt. % nitrogen (diluent) based on the weight of the fourth mixture. Fuel rate is $2.96 \times 10^{-4}$ Kg/s and oxidant rate is 0.024 Kg/s, at a feed pressure of 1.172 bar (absolute; 2.3 psig). The mixer-distributor mixes the first and second reactants to produce the fourth mixtures and distributes the fourth mixture to provide a relatively uniform gas flow through the second reactor, which is in the form of a honeycomb monolith. Plates 3 and 4 are used to redistribute the flow uniformly over the honeycomb monolith. Reducing hole overlap between plates 1 and 2 is observed to improve mixing of the fuel and oxidant. The mixer-distributor has a pressure drop of 0.8 bar, and MD of 5.7%, a TV of 70%, and an ME of 98.3 wt. %.

Example 2

A regenerative, reverse-flow reactor is provided, the reactor being the same as that of Example 1 except that a mixer distributor of U.S. Pat. No. 7,815,873, FIG. 6, was substituted for the mixer-distributor of the example. A combustion step was operated using the same feed and conditions as specified in Example 1. The mixer distributor has an MD equal to about 9.2%.

Discussion

Utilizing the mixer-distributor of the invention (Example 1) provides improved mixing-distribution performance over the mixer of the prior art (Example 2), indicating that the distribution of the fourth mixture is improved, leading to a more efficient oxidation step. In particular, the mixer-distributor of Example 1 has (i) a significantly reduced MD and (ii) pressure drop, TV, and ME values that are the same as or better than those of the mixer-distributor of Example 2.

What is claimed is:

1. A regeneration method, comprising:
   (a) conducting fuel through at least one first conduit and oxidant through at least one second conduit, the first and second conduits being located in a recuperation zone of a reactor system;
   (b) combining and reacting at least a portion of the fuel with at least a portion of the oxidant in a mixing-distributing zone to produce heat and a first reaction product, the mixing-distributing zone being located (i) in the reactor system and (ii) downstream of the recuperation zone and upstream of a reaction zone, the mixing-distributing zone comprising a mixer-distributor having a Maldistribution ≤15.0%, a pressure drop ≤0.3 bar, and a combined fuel-oxidant flow rate ≥10.0 kg/hr; and
   (c) conducting the reaction product through the reaction zone and transferring at least a portion of the heat from the reaction product to the reaction zone;
   wherein
   (A) the mixer-distributor comprises a plurality of first orifices in a first location; at least one second orifice at a second location, the first location being upstream of the second location with respect to the fuel-oxidant flow; and a fuel-oxidant flow preventer for preventing fuel-oxidant flow through the mixer-distributor except via the orifices, the fuel-oxidant flow preventer comprising a first plate proximate to the first location and a second plate proximate to the second location, the first orifices being perforations in the first plate and the second orifice being a perforation in the second plate, wherein the number of orifices at the first location is greater than the number of orifices at the second location;
   (B) (i) the first and second plates are of substantially circular cross-section;
   (ii) the first plate has a cross-sectional area $A_{p1}$ and the second plate has a cross-sectional area $A_{p2}$, $A_{p1}$ being within +/−10.0% of $A_{p2}$;
   (iii) the first plate has a cross-sectional area of the plurality of orifices $A_{h1}$ and the second plate has a cross-sectional area of the substantially-centered orifice $A_{h2}$, $A_{h1}$ being within +/−10.0% $A_{h2}$,
   (iv) $A_{p1} \leq 2.0\, A_{h1}$;
   (v) the first plate has a thickness $T_{p1}$ and the second plate has a thickness $T_{p2}$, $T_{p1}$ and $T_{p2}$ are each $\leq 0.5 \cdot D_p$, where $D_p$ is the effective plate diameter; and
   (vi) a distance between the downstream face of first plate and the upstream face of second plate $S_{p1-p2}$ is in the range of $0.25 \cdot S_b$ to $5.0 \cdot S_b$, where $S_b$ equals $A_{h1}$ divided by the perimeter of plate 1; and
   (C) the mixer-distributor further comprises third, fourth, and fifth perforated plates of substantially circular cross-section, the fifth plate being upstream of the first plate, the third plate being downstream of the second plate, and the fourth plate being downstream of the third plate, wherein
   (i) the fifth plate has a number of perforations in the range of 3 to 6 times the number of perforations in the first plate, a cross-sectional area $A_{p5}$ being within +/−10.0% of $A_p$, a cross-sectional area of the plurality of orifices $A_{h5}$ being within +/−10.0% of $A_{h1}$, a thickness $T_{p5}$ being within +/−10.0% of $T_{p1}$, and a distance between the downstream face of fifth plate and the upstream face of first plate $S_{p5-p1}$ being within +/−10.0% of $S_{p1-p2}$;
   (ii) the third plate has substantially the same number of perforations as the first plate, with a cross-sectional area $A_{p3}$ being within +/−10.0% of $A_{p1}$, a cross-sectional area of the plurality of orifices $A_{h3}$ being within +/−10.0% of $A_{h1}$, a thickness $T_{p3}$ being within +/−10.0% of $T_{p1}$, and a distance between the downstream face of second plate and the upstream face of third plate $S_{p2-p3}$ being within +/−10.0% of $S_{p1-p2}$; and
   (iii) the fourth plate has substantially the same number of perforations as the fifth plate, with a cross-sectional area $A_{p4}$ being within +/−10.0% of $A_{p1}$, a cross-sectional area of the plurality of orifices $A_{h4}$ being within +/−10.0% of $A_{h1}$, a thickness $T_{p4}$ being within +/−10.0% of $T_{p1}$, and a distance between the downstream face of third plate and the upstream face of fourth plate $S_{p3-p4}$ being within +/−10.0% of $S_{p1-p2}$.

2. The method of claim 1, wherein the mixer-distributor has a Maldistribution ≤10.0%, a pressure drop ≤0.1 bar, and a combined fuel-oxidant flow rate ≥100.0 kg/hr.

3. The method of claim 1, wherein the mixer-distributor has a Mixing Efficiency ≥75.0 wt. %.

4. The method of claim 1, wherein the mixer-distributor has a Temperature Variability ≤60.0° C.

5. The method of claim 1, wherein the mixer-distributor includes swirling means having a swirl number in the range of from 0.1 to 1.3.

6. The method of claim 1, wherein (i) at least one orifice at the second location is substantially coaxial with the mixing-distributing zone and (ii) the number of orifices at the first location is in the range of 2 times to 8 times the number of orifices at the second location.

7. The method of claim 1, wherein the first and second plates are substantially parallel and coaxial, and wherein the second orifice is substantially coaxial with (i) the second plate and (ii) with the mixing-distributing zone.

8. The method of claim 1, wherein one or more of plates 1-5 comprise at least one of yttria, zirconia, alumina, or silica.

9. The method of claim 1, wherein the mixer-distributor has a segment height L and a segment characteristic D and a L:D ratio in the range of from 0.5 to 1.5.

10. The method of claim 1, wherein the reacting heats at least a portion of the reactor to a temperature $\geq 1.40 \times 10^{3 \circ}$ C., the reacting occurring at a pressure $\geq 1.0$ bar.

11. The method of claim 1, wherein the fuel is a mixture, the mixture comprising $\geq 10.0$ wt. % hydrocarbon based on the weight of the mixture.

12. The method of claim 1, wherein the fuel comprises $\geq 25.0$ wt. % methane based on the weight of the fuel.

13. The method of claim 1, wherein the oxidant comprises $\geq 10.0$ wt. % molecular oxygen based on the weight of the oxidant.

14. The method of claim 1, further comprising conducting diluent through the second conduit during step (a).

15. The method of claim 1, wherein the mixer-distributor has a total volume $\leq 10.0$% of the sum of (i) the mixing-distributing zone's volume, (ii) the recuperator zone's volume, and (iii) the reaction zone's volume.

16. The method of claim 1, wherein the reactor system produces unsaturated hydrocarbon by pyrolysis, the pyrolysis utilizing at least a portion of the heat.

17. A mixer-distributor for mixing and distributing a flow of fuel and oxidant in a mixing-distributing zone of a regenerative, reverse-flow reactor, the mixer-distributor comprising:

(a) at least one first baffle and a plurality of first orifices, the first baffle and plurality of first orifices being positioned at a first location in the mixer-distributor;

(b) at least one second baffle and at least one second orifice, the second baffle and second orifice being located at a second location in the mixer-distributor, wherein (i) the first location is upstream of the second location with respect to the fuel-oxidant flow and (ii) the first location has a greater number of orifices than the second location; and (c) an inner boundary of the mixing-distributing zone, the inner boundary being either (i) connected to the first baffle's perimeter and the second baffle's perimeters or (ii) sufficiently proximate to the first and second baffles' perimeters to substantially prevent the flow through the mixing-distributing zone except via the first and second orifices, wherein (A) the first baffle comprises a first perforated plate proximate to the first location and the second baffle comprises a second perforated plate proximate to the second location, the first plate's perforations being the first orifices and the second plate's perforations being the second orifices;

(B) at least one orifice at the second location is substantially coaxial with the mixing distributing zone; and (C) the number of orifices at the first location is in the range of 2 times to 8 times the number of orifices at the second location.

(D) the mixing-distributing zone is of substantially-uniform cross-sectional area, wherein (i) the first and second plates are substantially parallel plates that are coaxial and of substantially circular cross-section;

(ii) the first plate's perforations are of substantially-circular cross-sections and are equally-spaced along $R1_{p1}$;

(iii) the second orifice is substantially coaxial with (i) the second plate and (ii) the mixing-distributing zone;

(iv) the first plate has a cross-sectional area $A_{p1}$ and the second plate has a cross sectional area $A_{p2}$, $A_{p1}$ being within +/−10.0% of $A_{p2}$;

(v) the first plate has a cross-sectional area of the plurality of orifices $A_{h1}$ and the second plate has a cross-sectional area of the substantially-centered orifice $A_{h2}$, $A_{h1}$ being within +/−10.0% $A_{h2}$;

(vi) $A_{p1} > 2.0 A_{h1}$;

(vii) the first plate has a thickness $T_{p1}$ and the second plate has a thickness $T_{p2}$, $T_{p1}$ and $T_{p2}$ are each $\leq 0.5 \times D_p$, where $D_p$ is the effective plate diameter; and (viii) a distance between the downstream face of first plate and the upstream face of second plate $S_{p1-p2}$ is in the range of $0.25 \times S_b$ to $5.0 \times S_b$, where $S_b$ equals $A_{h1}$ divided by the perimeter of plate 1; and (E) the mixer-distributor further comprises third, fourth, and fifth perforated plates of substantially-circular cross-section, the fifth plate being upstream of the first plate, the third plate being downstream of the second plate, and the fourth plate being downstream of the third plate, wherein (i) the fifth plate has a number of perforations in the range of 3 to 6 times the number of perforations in the first plate, a cross-sectional area $A_{p5}$ being within +/−10.0% of $A_{p1}$, a cross-sectional area of the plurality of orifices $A_{h5}$ being within +/−10.0% of $A_{h1}$, a thickness $T_{p5}$ being within +/−10.0% of $T_{p1}$, and a distance between the downstream face of fifth plate and the upstream face of first plate $S_{p5-p1}$ being within +/−10.0% of $S_{p1-p2}$;

(ii) the third plate has substantially the same number of perforations as the first plate, with a cross-sectional area $A_{p3}$ being within +/−10.0% of $A_{p1}$, a cross-sectional area of the plurality of orifices $A_{h3}$ being within +/−10.0% of $A_{h1}$, a thickness $T_{p3}$ being within +/−10.0% of $T_{p1}$, and a distance between the downstream face of second plate and the upstream face of third plate $S_{p2-p3}$ being within +/−10.0% of $S_{p1-p2}$; and (iii) the fourth plate has substantially the same number of perforations as the fifth plate, with a cross-sectional area $A_{p4}$ being within +/−10.0% of $A_{p1}$, a cross-sectional area of the plurality of orifices $A_{h4}$ being within +/−10.0% of $A_{h1}$, a thickness $T_{p4}$ being within +/−10.0% of $T_{p1}$, and a distance between the downstream face of third plate and the upstream face of fourth plate $S_{p3-p4}$ being within +/−10.0% of $S_{p1-p2}$.

(iv) the mixer–distributor has a segment height L and a segment characteristic D and a L:D ratio in the range of from 0.5 to 1.5;

(v) the mixer-distributor includes swirling means having a swirl number in the range of from 0.1 to 1.3;

(vi) $\delta_1$ is in the range of 0.0° to 30.0° and $\delta_2$ is in the range of 0.0° to 60.0° ; and (vii) one or more of plates 1-5 comprise at least one of yttria, zirconia, alumina, or silica.

* * * * *